(12) United States Patent
Huang et al.

(10) Patent No.: US 11,691,079 B2
(45) Date of Patent: Jul. 4, 2023

(54) VIRTUAL VEHICLE CONTROL METHOD IN VIRTUAL SCENE, COMPUTER DEVICE, AND STORAGE MEDIUM

(71) Applicant: TENCENT TECHNOLOGY (SHENZHEN) COMPANY LIMITED, Guangdong (CN)

(72) Inventors: Xinlong Huang, Shenzhen (CN); Yu Wang, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 0 days.

(21) Appl. No.: 17/512,129

(22) Filed: Oct. 27, 2021

(65) Prior Publication Data

US 2022/0047944 A1 Feb. 17, 2022

Related U.S. Application Data

(63) Continuation of application No. 17/030,505, filed on Sep. 24, 2020, now Pat. No. 11,185,773, which is a
(Continued)

(30) Foreign Application Priority Data

Aug. 30, 2018 (CN) .......................... 201811009156.0

(51) Int. Cl.
*A63F 13/5258* (2014.01)
*A63F 13/2145* (2014.01)
(Continued)

(52) U.S. Cl.
CPC ...... *A63F 13/5258* (2014.09); *A63F 13/2145* (2014.09); *A63F 13/803* (2014.09); *A63F 13/92* (2014.09); *A63F 2300/8082* (2013.01)

(58) Field of Classification Search
CPC .............. A63F 13/5258; A63F 13/2145; A63F 13/803; A63F 13/92; A63F 2300/8082
See application file for complete search history.

(56) References Cited

U.S. PATENT DOCUMENTS 7,753,785 B2 * 7/2010 Nishimura .......... A63F 13/5258
463/31
8,216,069 B2 7/2012 Ito
(Continued)

FOREIGN PATENT DOCUMENTS

CN 106362402 A 2/2017
CN 107096223 A 8/2017
(Continued)

OTHER PUBLICATIONS

Office Action for corresponding CN 201811009156.0, dated Oct. 11, 2019.
(Continued)

*Primary Examiner* — Steven J Hylinski
(74) *Attorney, Agent, or Firm* — Sughrue Mion, PLLC

(57) ABSTRACT

A virtual vehicle control method in a virtual scene, performed by a terminal, is provided. The method includes providing a display interface of an application program, the display interface including a scene picture of the virtual scene, and the virtual scene including a virtual vehicle; obtaining a moving speed of the virtual vehicle; and adjusting, based on the moving speed of the virtual vehicle being greater than a moving speed threshold, the scene picture to a picture of the virtual vehicle being observed in the virtual scene by using a camera model in a predetermined viewing angle direction, the camera model being located at a position with respect to the virtual vehicle.

20 Claims, 13 Drawing Sheets

Related U.S. Application Data continuation of application No. PCT/CN2019/102160, filed on Aug. 23, 2019.

(51) Int. Cl.
  *A63F 13/803* (2014.01)
  *A63F 13/92* (2014.01)

(56) References Cited

U.S. PATENT DOCUMENTS

| | | |
|---|---|---|
| 10,688,392 B1 | 6/2020 | Hardiman et al. |
| 10,870,053 B2 | 12/2020 | He et al. |
| 2004/0219980 A1 | 11/2004 | Bassett et al. |
| 2004/0224761 A1 | 11/2004 | Nishimura |
| 2007/0077541 A1 | 4/2007 | Champagne et al. |
| 2008/0119285 A1 | 3/2008 | Yamashita |
| 2011/0212776 A1 | 9/2011 | Kishimoto et al. |
| 2013/0217498 A1 | 8/2013 | Wang |
| 2015/0182856 A1 | 7/2015 | Mays, III et al. |
| 2016/0378311 A1* | 12/2016 | Kim .................... G06F 3/04883 715/769 |
| 2018/0012428 A1 | 1/2018 | Shi et al. |
| 2019/0336860 A1* | 11/2019 | Yabuki ................. A63F 13/577 |
| 2019/0336863 A1* | 11/2019 | Hayashi ................ A63F 13/69 |
| 2021/0008445 A1* | 1/2021 | Hayashi ................ G06F 3/011 |

FOREIGN PATENT DOCUMENTS

| | | |
|---|---|---|
| CN | 107185231 A | 9/2017 |
| CN | 108434730 A | 8/2018 |
| CN | 108434733 A | 8/2018 |
| CN | 109260702 A | 1/2019 |
| JP | 11-146978 A | 6/1999 |

OTHER PUBLICATIONS

The Second Office Action for corresponding CN 201811009156.0, dated Dec. 11, 2019.

International Search Report for PCT/CN2019/102160, dated Oct. 29, 2019.

PCT/ISA/237—Written Opinion of the International Searching Authority for PCT/CN2019/102160.

\* cited by examiner

VIRTUAL VEHICLE CONTROL METHOD IN VIRTUAL SCENE, COMPUTER DEVICE, AND STORAGE MEDIUM

CROSS-REFERENCE TO RELATED APPLICATION(S)

This application is a continuation application of U.S. application Ser. No. 17/030,505 filed Sep. 24, 2020, which is a bypass continuation application of International Application No. PCT/CN2019/102160, filed Aug. 23, 2019, which claims priority to Chinese Patent Application No. 201811009156.0, entitled "VIRTUAL VEHICLE CONTROL METHOD IN VIRTUAL SCENE, COMPUTER DEVICE, AND STORAGE MEDIUM" and filed on Aug. 30, 2018, the disclosures of which are herein incorporated by reference in their entireties.

FIELD

The disclosure relates to the field of virtual scene technologies, and in particular, to a virtual vehicle control method in a virtual scene, a computer device, and a storage medium.

BACKGROUND

Application programs (for example, a virtual reality application program, a three-dimensional map program, a military simulation program, a first-person shooting game, and a multiplayer online battle arena game) in which a virtual scene is constructed may provide a function of controlling a virtual vehicle that is included in the virtual scene.

In the related art, in a display interface of a virtual scene presented on a screen of a terminal (e.g., a touch screen terminal), a virtual control, such as a virtual joystick or a virtual button, used for controlling a moving direction of a virtual vehicle in the virtual scene is typically included. When the terminal detects a touch operation of a user on the virtual joystick or the virtual button, the terminal controls the virtual vehicle to move toward a direction corresponding to the virtual joystick or the virtual button.

However, the application program in the related art only provides a virtual control used for controlling the moving direction of the virtual vehicle, and thus, only a few moving factors of the virtual vehicle in the virtual scene may be controlled by the user, leading to a relatively poor control effect of the user on the virtual vehicle.

SUMMARY

One or more example embodiments of the disclosure provide a method of controlling a virtual vehicle in a virtual scene, a computer device, and a storage medium, that solve the problem in the related art that a control effect of a virtual vehicle on a user has relatively poor quality and limited due to only a few moving factors of the virtual vehicle in the virtual scene that is controllable by the user, thereby expanding the operability of the virtual vehicle.

According to an aspect of an example embodiment, provided is a virtual vehicle control method in a virtual scene, performed by a terminal, the method including: providing a display interface of an application program, the display interface including a scene picture of the virtual scene, and the virtual scene including a virtual vehicle; obtaining a moving speed of the virtual vehicle; and adjusting, based on the moving speed of the virtual vehicle being greater than a moving speed threshold, the scene picture to a picture of the virtual vehicle being observed in the virtual scene by using a camera model in a predetermined viewing angle direction, the camera model being located at a position with respect to the virtual vehicle.

The display interface may further include at least one primary virtual control that is overlaid on the scene picture, and the method may further include: obtaining, in response to detecting a specified operation on the at least one primary virtual control, at least one of a steering angle or a virtual throttle opening of the virtual vehicle according to the specified operation; and controlling the virtual vehicle to move according to the at least one of the steering angle or the virtual throttle opening of the virtual vehicle.

The obtaining may include obtaining the virtual throttle opening of the virtual vehicle according to the specified operation, and the controlling may include controlling the virtual vehicle to accelerate within a maximum moving speed according to the virtual throttle opening.

The display interface may further include an auxiliary virtual control that is overlaid on the scene picture, and the auxiliary virtual control may include at least one of a longitudinal attitude control for controlling a longitudinal attitude of the virtual vehicle, a sudden acceleration control for controlling the virtual vehicle to perform sudden acceleration, a brake control for controlling the virtual vehicle to brake, or a reverse control for controlling the virtual vehicle to reverse.

According to an aspect of an example embodiment, provided is a virtual vehicle control method in a virtual scene, performed by a terminal, the method including: providing a display interface of an application program, the display interface including a scene picture of the virtual scene and at least one primary virtual control, the virtual scene including a virtual vehicle and the at least one primary virtual control being overlaid on the scene picture; obtaining, in response to detecting a specified operation on the at least one primary virtual control, at least one of a steering angle or a virtual throttle opening of the virtual vehicle in the scene picture according to the specified operation; and controlling the virtual vehicle to move according to the at least one of the steering angle or the virtual throttle opening of the virtual vehicle.

The controlling may include at least one of: controlling the virtual vehicle to move in a moving direction of the virtual vehicle according to the steering angle of the virtual vehicle; or controlling the virtual vehicle to accelerate within a maximum moving speed of the virtual vehicle according to the virtual throttle opening of the virtual vehicle.

The at least one primary virtual control may include a first virtual control and a second virtual control, and the obtaining may include obtaining the steering angle of the virtual vehicle according to a position of a first operation performed in a region around the first virtual control, and/or obtaining the virtual throttle opening of the virtual vehicle according to a position of a second operation performed in a region around the second virtual control.

The obtaining the steering angle of the virtual vehicle according to the position of the first operation may include obtaining the steering angle of the virtual vehicle according to a directional angle or a transverse offset distance of the position of the first operation relative to a central position of the first virtual control, and the obtaining the virtual throttle opening of the virtual vehicle according to the position of the second operation may include obtaining the virtual throttle opening of the virtual vehicle according to a directional angle of the position of the second operation relative to a central position of the second virtual control or according to a transverse offset distance of the position of the second operation relative to a left vertex or a right vertex of the second virtual control.

The at least one primary virtual control may include a third virtual control, the specified operation may include a third operation performed in a region around the third virtual control, and the obtaining may include obtaining the at least one of the steering angle or the virtual throttle opening of the virtual vehicle according to a position of the third operation.

The obtaining the at least one the steering angle or the virtual throttle opening of the virtual vehicle according to the position of the third operation may include: obtaining the steering angle of the virtual vehicle according to a directional angle or a transverse offset distance of the position of the third operation relative to a central position of the third virtual control; and/or obtaining the virtual throttle opening of the virtual vehicle according to a straight-line distance of the position of the third operation relative to the central position of the third virtual control.

The display interface may further include an auxiliary virtual control, and the auxiliary virtual control may include at least one of a longitudinal attitude control for controlling a longitudinal attitude of the virtual vehicle, a sudden acceleration control for controlling the virtual vehicle to perform sudden acceleration, a brake control for controlling the virtual vehicle to brake, or a reverse control for controlling the virtual vehicle to reverse.

The method may further include obtaining a moving speed of the virtual vehicle; and adjusting, based on the moving speed of the virtual vehicle being greater than a moving speed threshold, the scene picture to a picture of the virtual vehicle being observed in the virtual scene by using a camera model in a predetermined viewing angle direction, the camera model being located at a position with respect to the virtual vehicle.

According to an aspect of an example embodiment, provided is a terminal, including: at least one memory configured to store program code; and at least one processor configured to read the program code and operate as instructed by the program code, the program code including: an interface providing code configured to cause at least one of the at least one processor to provide a display interface of an application program, the display interface including a scene picture of a virtual scene and at least one primary virtual control, the virtual scene including a virtual vehicle and the at least one primary virtual control being overlaid on the scene picture; first obtaining code configured to cause at least one of the at least one processor to obtain in response to detecting a specified operation on the at least one primary virtual control, at least one of a steering angle or a virtual throttle opening of the virtual vehicle in the scene picture according to the specified operation; and control code configured to cause at least one of the at least one processor to control the virtual vehicle to move according to the at least one of the steering angle or the virtual throttle opening of the virtual vehicle.

The control code may further cause at least one of the at least one processor to control the virtual vehicle to move in a moving direction of the virtual vehicle according to the steering angle of the virtual vehicle or control the virtual vehicle to accelerate within a maximum moving speed of the virtual vehicle according to the virtual throttle opening of the virtual vehicle.

The at least one primary virtual control may include a first virtual control and a second virtual control, and the first obtaining code further causes at least one of the at least one processor to obtain the steering angle of the virtual vehicle according to a position of a first operation performed in a region around the first virtual control, and/or obtain the virtual throttle opening of the virtual vehicle according to a position of a second operation performed in a region around the second virtual control.

The at least one primary virtual control may include a third virtual control, the specified operation may include a third operation performed in a region around the third virtual control, and the first obtaining code may further cause at least one of the at least one processor to obtain the at least one of the steering angle or the virtual throttle opening of the virtual vehicle according to a position of the third operation.

The program code may further include: second obtaining code configured to cause at least one of the at least one processor to obtain a moving speed of the virtual vehicle; and adjusting code configured to cause at least one of the at least one processor to adjust, based on the moving speed of the virtual vehicle being greater than a moving speed threshold, the scene picture to a picture of the virtual vehicle being observed in the virtual scene by using a camera model in a predetermined viewing angle direction, the camera model being located at a position with respect to the virtual vehicle.

According to an aspect of an example embodiment, provided is a computer device, including at least one processor and at least one memory, the at least one memory storing program code executable by the at least one processor to cause the at least one processor to perform the foregoing method.

According to an aspect of an example embodiment, provided is a non-transitory computer-readable storage medium, storing program code executable by at least one processor to cause the at least one processor to perform the foregoing method.

According to an aspect of an example embodiment, provided is a non-transitory computer-readable storage medium, storing program code executable by at least one processor to cause the at least one processor to perform the foregoing method.

BRIEF DESCRIPTION OF THE DRAWINGS

The above and other aspects, features, and advantages of certain example embodiments of the disclosure will be more apparent from the following description taken in conjunction with the accompanying drawings. The accompanying drawings herein are incorporated into the specification and constitute a part of this specification.

DETAILED DESCRIPTION

Example embodiments are described in detail herein, and examples thereof are shown in the accompanying drawings. When the following descriptions are made with reference to the accompanying drawings, unless indicated otherwise, same numbers in different accompanying drawings represent the same or similar elements. The implementations described in the following example embodiments do not represent all implementations that are consistent with the disclosure. On the contrary, the implementations are merely examples of methods that are described in detail in the appended claims and that are consistent with some aspects of the disclosure.

Throughout the disclosure, the expression such as "at least one of a, b, and c" or "at least one of a, b or c" indicates only a, only b, only c, both a and b, both a and c, both b and c, all of a, b, and c, or any combinations or variations thereof.

Virtual scene: a virtual scene displayed (or provided) when an application program is run on a terminal. The virtual scene may be a simulated environment scene of a real world, or may be a semi-simulated and/or semi-fictional three-dimensional environment scene, or may be an entirely fictional three-dimensional environment scene. The virtual scene may be any one of a two-dimensional virtual scene, a 2.5-dimensional virtual scene, and a three-dimensional virtual scene. For illustrative purposes, description is made by using an example in which the virtual scene is a three-dimensional virtual scene in the following embodiments, but the disclosure is not limited. Optionally, the virtual scene may be further used for a virtual scene battle between at least two virtual roles. Optionally, the virtual scene may be further used for a battle performed between at least two virtual roles by using virtual guns. Optionally, the virtual scene may be further used for a battle performed between at least two virtual roles by using virtual guns in a range of a target region, and the range of the target region may be continuously decreased as time goes by in the virtual scene.

Virtual object: a movable object in a virtual scene. The movable object may be at least one of a virtual character, a virtual animal, and a virtual vehicle. Optionally, when the virtual scene is a three-dimensional virtual scene, the virtual object is a three-dimensional model created based on a skeletal animation technology. Each virtual object has a shape, a volume and an orientation in the three-dimensional virtual scene, and occupies some space in the three-dimensional virtual scene.

The virtual scene is typically generated by an application program on a computer device such as a terminal and presented by hardware (for example, a screen) in the terminal. The terminal may be a mobile terminal such as a smartphone, a tablet computer or an e-book reader. Alternatively, the terminal may be a personal computer device such as a notebook computer or a stationary computer.

Figure 1:
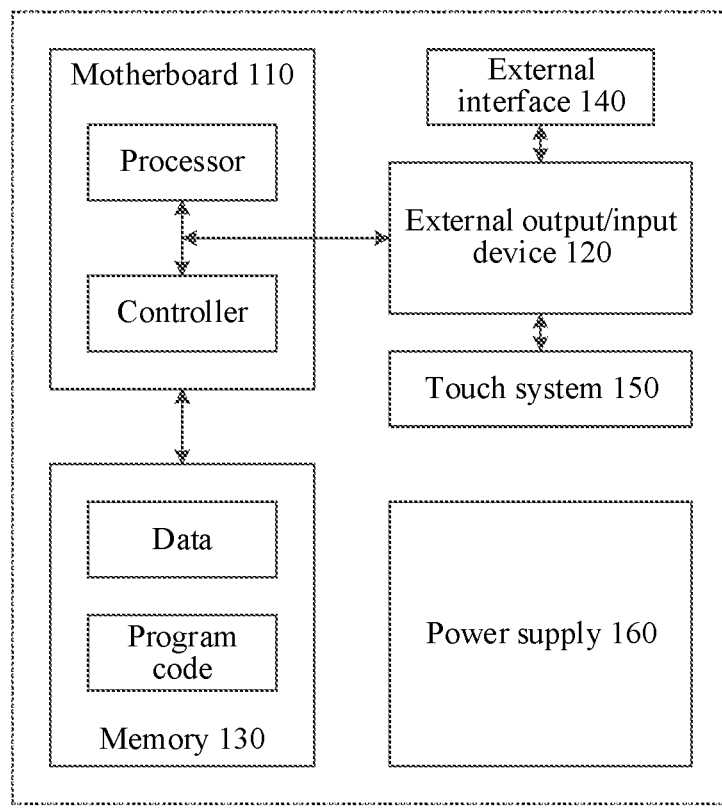
FIG. 1 is a schematic structural diagram of a terminal according to an example embodiment of the disclosure.

FIG. 1 shows a schematic structural diagram of a terminal according to an example embodiment of the disclosure. As shown in FIG. 1, the terminal includes a motherboard 110, an external output/input device 120, a memory 130, an external interface 140, a touch system 150, and a power supply 160.

Processing elements such as a processor and a controller are integrated in the motherboard 110.

The external output/input device 120 may include a display component (for example, a display screen), a sound playing component (for example, a loudspeaker), a sound acquisition component (for example, a microphone), and various types of buttons.

The memory 130 stores program code and data.

The external interface 140 may include an earphone interface, a charging interface, and a data interface.

The touch system 150 may be integrated in the display component or the buttons of the external output/input device 120, and the touch system 150 is configured to detect a touch operation performed by a user on the display component or the buttons.

The power supply 160 is configured to supply power to other components in the terminal.

In an embodiment of the disclosure, the processor in the motherboard 110 may generate a virtual scene by executing or invoking the program code and data stored in the memory, and present the generated virtual scene by using the external output/input device 120. In a process of presenting the virtual scene, a touch operation performed when the user interacts with the virtual scene may be detected by using the touch system 150.

Figure 2:
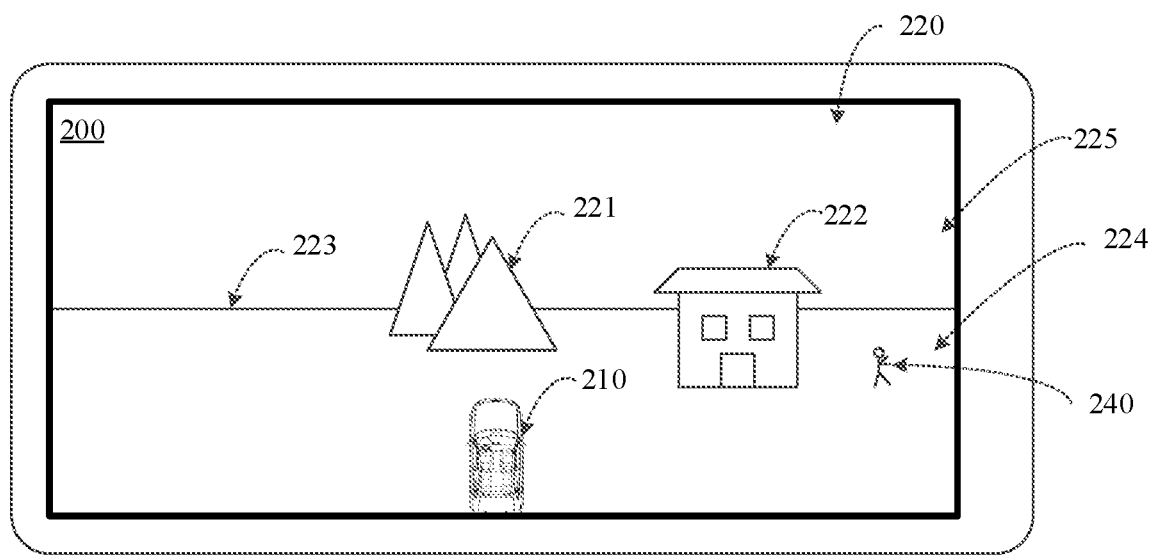
FIG. 2 is a schematic view illustrating a display interface of a virtual scene according to an example embodiment of the disclosure.

The virtual scene may be a three-dimensional virtual scene, or the virtual scene may be a two-dimensional virtual scene. Using an example in which the virtual scene is a three-dimensional virtual scene, FIG. 2 shows a schematic diagram of a display interface of a virtual scene according to an example embodiment of the disclosure. As shown in FIG. 2, the display interface of the virtual scene includes a scene picture 200, and the scene picture 200 includes a virtual vehicle 210, an environment picture 220 of the three-dimensional virtual scene, and a virtual object 240. The virtual vehicle 210 may be a virtual vehicle in which a current virtual object of a user corresponding to the terminal is located. For example, when the current virtual object of the user corresponding to the terminal is a virtual character, the virtual vehicle 210 is a virtual vehicle taken by the virtual character. Alternatively, the virtual vehicle 210 may be a current virtual object of a user corresponding to the terminal. The virtual object 240 may be a virtual object controlled by a user corresponding to another terminal.

In FIG. 2, the virtual vehicle 210 and the virtual object 240 are three-dimensional models in the three-dimensional virtual scene, and the environment picture 220 of the three-dimensional virtual scene displayed in the scene picture 200 includes objects observed from a viewing angle of the virtual vehicle 210. Exemplarily, as shown in FIG. 2, the displayed environment picture 220 of the three-dimensional virtual scene includes the ground 224, the sky 225, the horizon 223, a hill 221, and a factory 222, which are observed from the viewing angle of the virtual vehicle 210.

The virtual vehicle 210 may move instantly under the control of the user. For example, if a terminal screen supports a touch operation and a virtual control is included in the scene picture 200 of the virtual scene, when the user touches the virtual control, the virtual vehicle 210 may move in the virtual scene.

In an embodiment of the disclosure, the virtual vehicle may perform operations such as viewing angle adjustment, movement, and attitude change under the control of the terminal.

Figure 3:
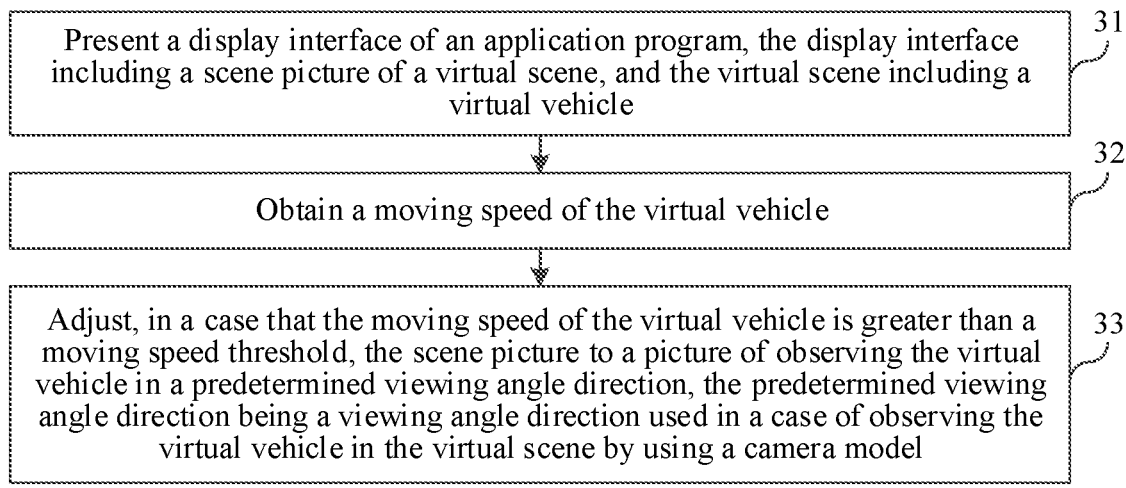
FIG. 3 is a flowchart illustrating a virtual vehicle control process in a virtual scene according to an example embodiment of the disclosure.

For example, FIG. 3 shows a flowchart of a virtual vehicle control process in a virtual scene according to an example embodiment of the disclosure. As shown in FIG. 3, by running on a terminal (for example, the terminal shown in FIG. 1) an application program corresponding to the virtual scene, the virtual vehicle in the virtual scene may be controlled to perform viewing angle adjustment by performing the following operations 31-33.

Operation 31: Present a display interface of an application program, the display interface including a scene picture of a virtual scene, and the virtual scene including a virtual vehicle.

The scene picture of the virtual scene is a picture of the virtual scene or a virtual object in the virtual scene that is observed from a viewing angle direction.

Operation 32: Obtain a moving speed of the virtual vehicle.

Operation 33: Adjust, in a case that the moving speed of the virtual vehicle is greater than a moving speed threshold, the scene picture to a picture of the virtual vehicle being observed in a predetermined viewing angle direction, the predetermined viewing angle direction being a viewing angle direction in which the virtual vehicle in the virtual scene is observed by using a camera model, and the camera model being located around the virtual vehicle, e.g., above a rear portion of the virtual vehicle.

According to the solution shown in an embodiment of the disclosure, in a case that the moving speed of the virtual vehicle controlled by the terminal is greater than a preset threshold, the terminal may automatically adjust a viewing angle direction of the scene picture to a direction in which the virtual vehicle is observed from the above of the rear portion of the virtual vehicle, to provide a function of adjusting the viewing angle while controlling the virtual vehicle, thereby automatically adjusting the viewing angle according to the moving speed of the virtual vehicle and expanding the operability of the virtual vehicle.

Figure 4:
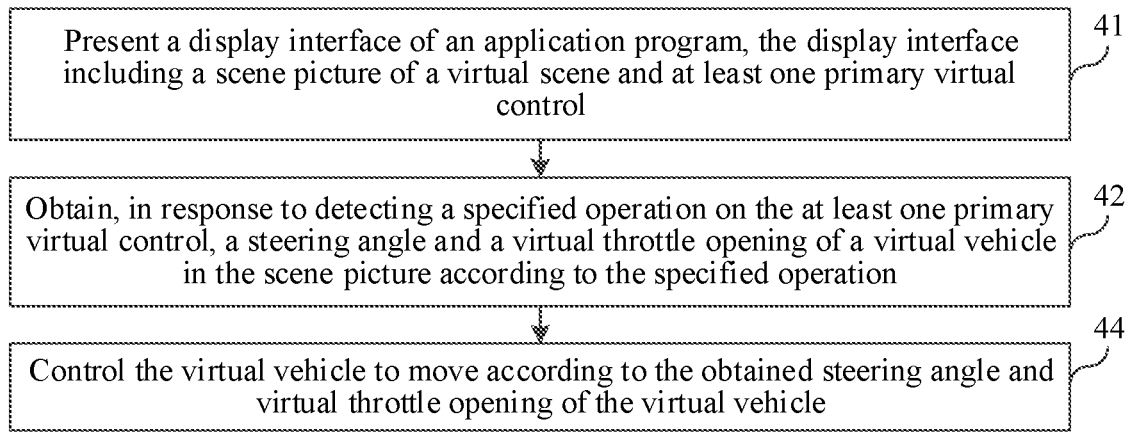
FIG. 4 is a flowchart illustrating a virtual vehicle control process in a virtual scene according to an example embodiment of the disclosure.

In another example, FIG. 4 shows a flowchart of a virtual vehicle control process in a virtual scene according to an example embodiment of the disclosure. As shown in FIG. 4, by running a terminal (for example, the terminal shown in FIG. 1) of an application program corresponding to the virtual scene, a movement of the virtual vehicle in the virtual scene may be controlled by performing the following operations 41, 42, 44.

Operation 41: Present a display interface of an application program, the display interface including a scene picture of a virtual scene and at least one primary virtual control.

The at least one primary virtual control is overlaid on an upper layer of the scene picture.

In an embodiment of the disclosure, in addition to displaying the scene picture of the virtual scene, a virtual control is further overlay-displayed on the upper layer of the scene picture in the display interface of the application program, and the user may implement the control of a virtual object in the virtual scene by performing an operation on the virtual control.

Operation 42: Obtain, in response to detecting a specified operation on the at least one primary virtual control, at least one of a steering angle and a virtual throttle opening of a virtual vehicle in the scene picture according to the specified operation.

The virtual throttle opening and a speed factor of the virtual vehicle are positively correlated, and the speed factor includes at least one of an acceleration and a maximum moving speed.

In an embodiment of the disclosure, through the primary virtual control overlaid on the upper layer of the scene picture, the user may not only implement the control of the direction of the virtual vehicle, but also implement the control of the virtual throttle opening of the virtual vehicle, thereby implementing the control of the acceleration and/or the maximum moving speed of the virtual vehicle.

Operation 44: Control the virtual vehicle to move according to the obtained at least one of steering angle and virtual throttle opening of the virtual vehicle.

The virtual throttle opening may be positively correlated with the maximum moving speed and the acceleration of the virtual vehicle. That is, a larger virtual throttle opening indicates a higher maximum moving speed and a faster acceleration of the virtual vehicle.

Figure 5:
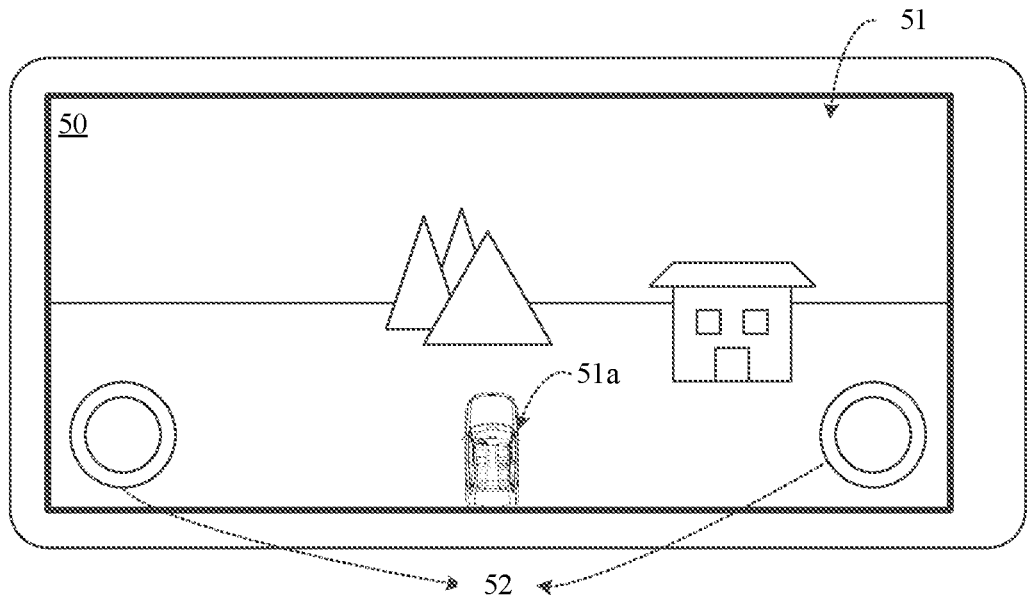
FIG. 5 is a schematic view illustrating a display interface of a virtual scene involved in the embodiment shown in FIG. 4.

FIG. 5 shows a schematic diagram of a display interface of a virtual scene involved in an embodiment of the disclosure. As shown in FIG. 5, the display interface 50 of the virtual scene includes a scene picture 51 and at least one primary virtual control 52 (two virtual controls are shown in FIG. 5), and the scene picture 51 includes a virtual vehicle 51a. A user may control a moving direction and a virtual throttle opening of the virtual vehicle 51a in the virtual scene by using the primary virtual control 52.

According to the solution shown in an embodiment of the disclosure, the virtual control is overlay-displayed on the upper layer of the scene picture of the virtual scene, and the steering angle and the virtual throttle opening of the virtual vehicle in the virtual scene are determined according to an operation of the user for the virtual control, thereby implementing the control of both the direction and the speed of the virtual vehicle and improving a control effect on the virtual vehicle.

In another example, the display interface may further include a longitudinal attitude control overlaid on the upper layer of the scene picture, and the longitudinal attitude control may control a longitudinal attitude of the virtual vehicle. For example, the longitudinal attitude may include a longitudinal attitude corresponding to an ascent or a descent of the virtual vehicle.

Figure 6:
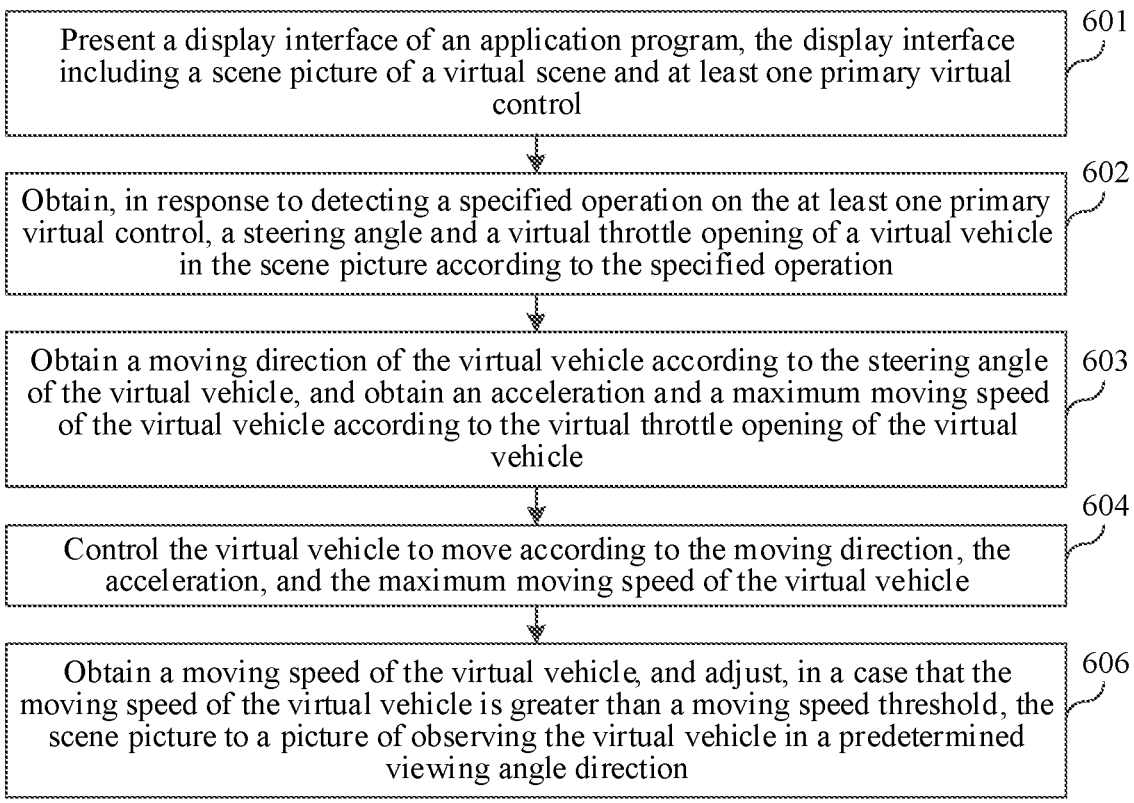
FIG. 6 is a flowchart illustrating a virtual vehicle control method in a virtual scene according to an example embodiment of the disclosure.

FIG. 6 shows a method flowchart of a virtual vehicle control method in a virtual scene according to an example embodiment of the disclosure. As shown in FIG. 6, by running on a terminal (for example, the terminal shown in FIG. 1) an application program corresponding to the virtual scene, viewing angle adjustment, movement, and attitude change of the virtual vehicle in the virtual scene may be controlled by performing the following operations 601-604, 606.

Operation 601: Present a display interface of an application program, the display interface including a scene picture of a virtual scene and at least one primary virtual control.

The at least one primary virtual control is overlaid on an upper layer of the scene picture.

In the solution shown in an embodiment of the disclosure, the primary virtual control may include two parts of virtual controls, where one part of virtual controls are used for controlling a steering angle of the virtual vehicle, and the other part of virtual controls are used for controlling a virtual throttle opening of the virtual vehicle.

For example, the at least one primary virtual control may include a first virtual control and a second virtual control. The first virtual control may be used for controlling the steering angle of the virtual vehicle, and the second virtual control may be used for controlling the virtual throttle opening of the virtual vehicle.

To help the user to operate and observe the scene picture, in an embodiment of the disclosure, the first virtual control and the second virtual control may be respectively disposed on left and right sides of the virtual vehicle. For example, in an example implementation, the first virtual control may be disposed on the left side of the virtual vehicle, and the second virtual control may be disposed on the right side of the virtual vehicle. Alternatively, in another example implementation, the first virtual control may be disposed on the right side of the virtual vehicle, and the second virtual control may be disposed on the left side of the virtual vehicle. Positions of the first virtual control and the second virtual control in the display interface are not limited in the embodiments of the disclosure.

Figure 7:
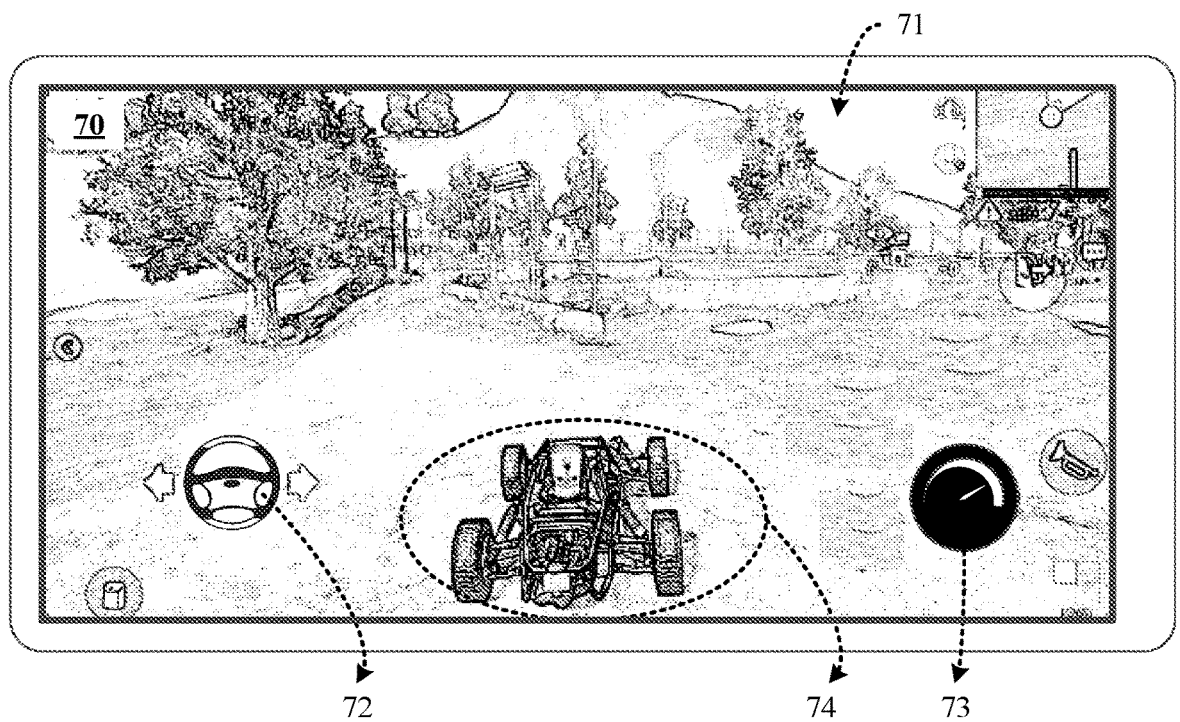
FIG. 7 is a schematic view illustrating a display interface involved in the embodiment shown in FIG. 6.

For example, FIG. 7 shows a schematic diagram of a display interface involved in an embodiment of the disclosure. As shown in FIG. 7, a display interface 70 of the virtual scene includes a scene picture 71, a virtual control 72, and a virtual control 73, and a middle lower part of the scene picture 71 includes a virtual vehicle 74. The virtual control 72 corresponds to the first virtual control and is used for controlling a steering angle of the virtual vehicle 74, and the virtual control 73 corresponds to the second virtual control and is used for controlling a virtual throttle opening of the virtual vehicle 74. The user may touch the virtual control 72 by using a left hand to control a direction of the virtual vehicle 74, and touch the virtual control 73 by using a right hand to control a virtual throttle of the virtual vehicle 74.

Alternatively, the primary virtual control may only include a single virtual control, and the virtual control is used for controlling both the steering angle of the virtual vehicle and the virtual throttle opening of the virtual vehicle.

For example, the at least one primary virtual control may include a third virtual control. To help the user to operate and observe the scene picture, in an embodiment of the disclosure, the third virtual control may be disposed on the left side or the right side of the virtual vehicle.

Figure 8:
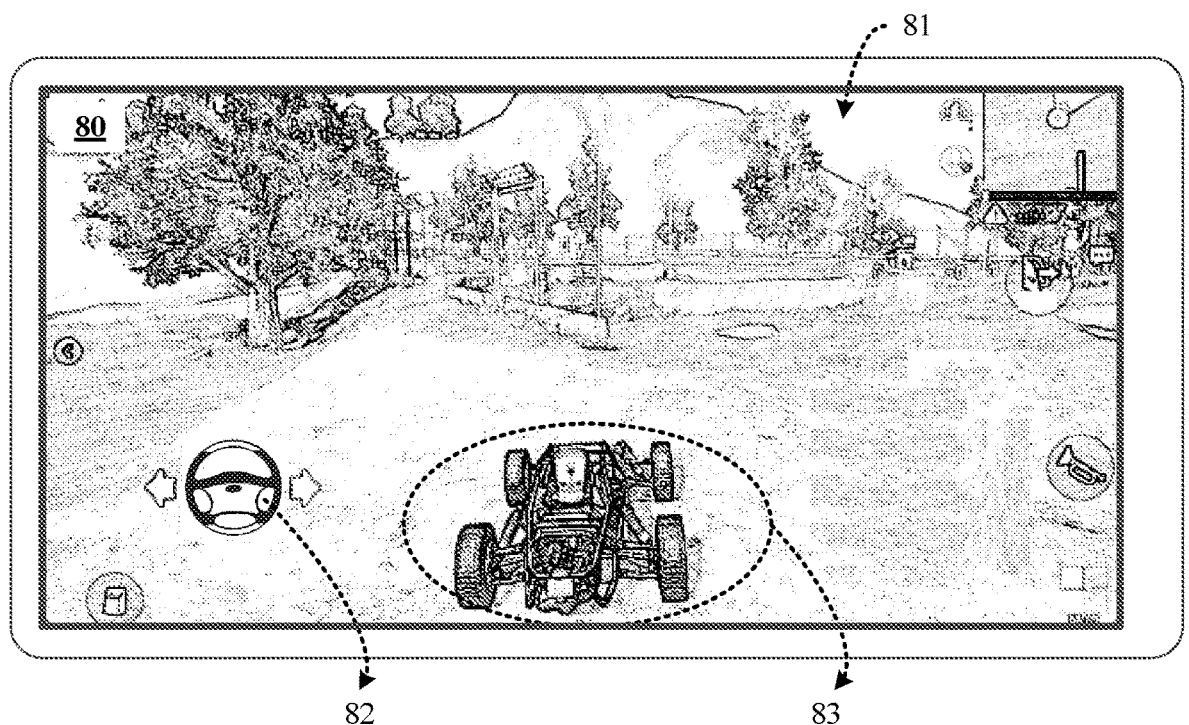
FIG. 8 is a schematic view illustrating another display interface involved in the embodiment shown in FIG. 6.

For example, FIG. 8 shows a schematic diagram of another display interface involved in an embodiment of the disclosure. As shown in FIG. 8, a display interface 80 of the virtual scene includes a scene picture 81 and a virtual control 82, and a middle lower part of the scene picture 81 includes a virtual vehicle 83. The virtual control 82 corresponds to the third virtual control and is used for controlling a steering angle and a virtual throttle opening of the virtual vehicle 83. The user may touch the virtual control 82 by using the left hand to control steering and a virtual throttle of the virtual vehicle 83. While examples of a display interface of the virtual scene are described above, the number of the virtual control of the at least one primary virtual control for controlling the virtual vehicle and the location of the virtual control on the display interface are not limited to these examples.

Operation 602: Obtain, in response to detecting a specified operation on the at least one primary virtual control, at least one of a steering angle and a virtual throttle opening of a virtual vehicle in the scene picture according to the specified operation.

In an embodiment of the disclosure, the specified operation may be a touch operation performed from a region in which the at least one primary virtual control is located. For example, the user may touch the region in which the primary virtual control is located, and adjust a direction and a virtual throttle of the virtual vehicle through touch operations (e.g., touch operation such as a slide, a drag, a flick, etc.), and touch information such as a touch position of the user may indicate a direction and a size of the virtual throttle for adjustment.

Optionally, when the at least one primary virtual control includes the first virtual control and the second virtual control, the specified operation may include a first operation performed from a region in which the first virtual control is located and a second operation performed from a region in which the second virtual control is located. During obtaining the steering angle and the virtual throttle opening of the virtual vehicle in the scene picture according to the specified operation, the terminal may obtain the steering angle of the virtual vehicle according to an operation position of the first operation, and obtain the virtual throttle opening of the virtual vehicle according to an operation position of the second operation.

In an example implementation, the terminal may obtain the steering angle of the virtual vehicle according to a directional angle of the operation position of the first operation relative to a central position of the first virtual control, or obtain the steering angle of the virtual vehicle according to a transverse offset distance of the operation position of the first operation relative to a central position of the first virtual control; and obtain the virtual throttle opening of the virtual vehicle according to a directional angle of the operation position of the second operation relative to a central position of the second virtual control, or obtain the virtual throttle opening of the virtual vehicle according to a transverse offset distance of the operation position of the second operation relative to a left vertex or a right vertex of the second virtual control.

Figure 9:
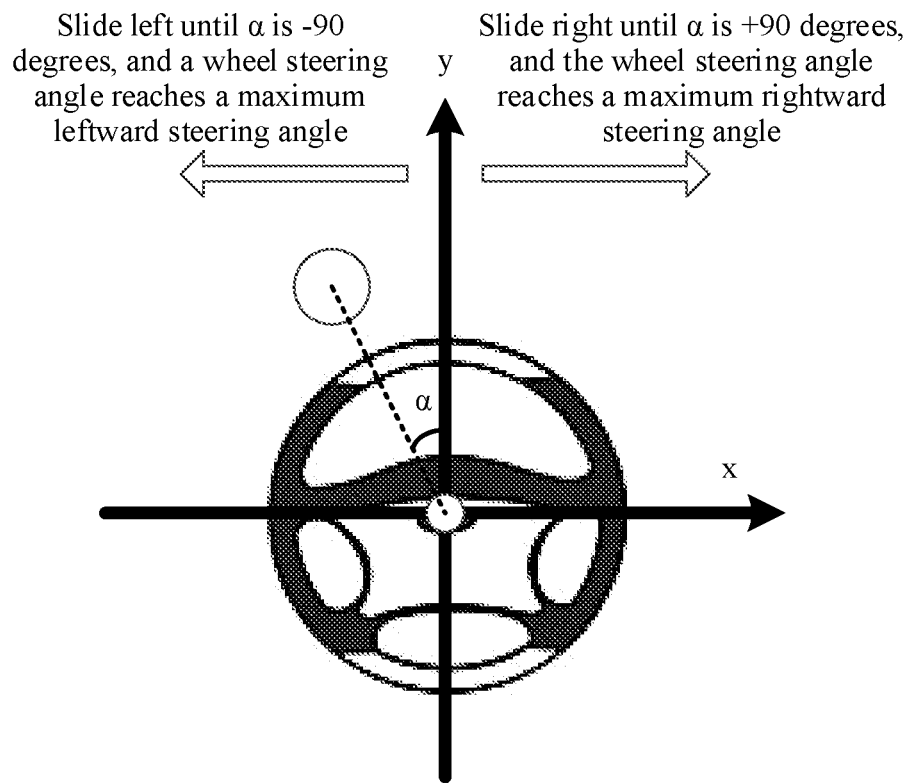
FIG. 9 is a schematic view illustrating controlling a steering angle through a virtual control involved in the embodiment shown in FIG. 6.

For example, FIG. 9 shows a schematic diagram of controlling a steering angle through a virtual control involved in an embodiment of the disclosure. As shown in FIG. 9, the first virtual control is a virtual steering wheel, and the user may touch a region in which the virtual steering wheel is located and slide left or right to adjust the steering angle of the virtual vehicle, where the steering angle may be represented by a wheel steering angle (may be a front wheel steering angle, or a rear wheel steering angle, or a front wheel steering angle and a rear wheel steering angle) of the virtual vehicle. Specifically, a direction of an operation position of the touch operation (e.g., touch and slide) relative to a central point of the virtual steering wheel may be represented by using an angle between a connecting line between the operation position of the touch and slide operation and the central point of the virtual steering wheel and an x axis or y axis in a plane coordinate system. For example, in FIG. 9, a rectangular coordinate system is established by using the central point of the virtual steering wheel as an origin, a transverse direction as an x-axis direction, and a longitudinal direction as a y-axis direction, and an angle α between the connecting line (a dotted line in FIG. 9) between the operation position of the touch and slide operation and the central point of the virtual steering wheel and the y axis indicates a direction of the operation position of the touch and slide operation relative to the central point of the virtual steering wheel. A larger absolute value of the angle α indicates a larger wheel steering angle of a corresponding virtual vehicle, when the angle α is 0 degrees, the wheel steering angle is also 0 degrees, and when the angle α reaches −90 degrees or +90 degrees, the wheel steering angle reaches a maximum steering angle to the left or to the right. In addition, a position relationship between the operation position of the touch and slide operation and the y axis indicates a direction of the wheel steering angle. Using an example in which when the operation position of the touch and slide operation is on a left side of the y axis, the angle α is a negative angle, and when the operation position of the touch and slide operation is on a right side of the y axis, the angle is a positive angle, when the angle α is 0 degrees, the wheel steering angle is also 0 degrees; when the operation position of the touch and slide operation is on the left side of the y axis, the direction of the wheel steering angle is leftward, and when the angle α is −90 degrees, the wheel steering angle reaches a maximum leftward steering angle; and when the operation position of the touch and slide operation is on the right side of the y axis, the direction of the wheel steering angle is rightward, and when the angle α is +90 degrees, the wheel steering angle reaches a maximum rightward steering angle.

Alternatively, in FIG. 9, the terminal may obtain a transverse offset distance of the operation position of the touch and slide operation relative to the central point of the virtual steering wheel, that is, a length of the connecting line, mapped to the x axis, between the operation position of the touch and slide operation and the central point of the virtual steering wheel. A larger transverse offset distance indicates a larger wheel steering angle of the corresponding virtual vehicle. When the transverse offset distance is 0, the wheel steering angle is also 0 degrees, and when the transverse offset distance reaches or exceeds a radius of the virtual steering wheel, the wheel steering angle reaches the maximum steering angle. In addition, a position relationship between the operation position of the touch and slide operation and the y axis indicates a direction of the wheel steering angle. When the operation position of the touch and slide operation is on a left side of the y axis, the direction of the wheel steering angle is leftward, and when the operation position of the touch and slide operation is on a right side of the y axis, the direction of the wheel steering angle is rightward.

Further, to present an operation effect of the user more intuitively, in FIG. 9, an icon of the virtual steering wheel also rotates according to the angle α by using a straight line perpendicular to the virtual steering wheel and running through the central point of the virtual steering wheel as an axis. When the terminal detects that the touch and slide operation ends, the terminal may restore the angle α to 0 degrees in a preset duration. When the user touches and holds the virtual steering wheel to slide left or right or obliquely, the user may control the virtual vehicle to turn leftward or rightward, and the virtual steering wheel may rotate left or right. When the user slides obliquely, a transverse offset distance of the x axis is used as a steering amplitude, when the user slides left or right to a maximum distance, the virtual steering wheel correspondingly reaches a maximum steering angle, the wheel steering angle also rotates to a maximum steering angle, and a steering ratio is equal to a ratio of the rotation angle of the virtual steering wheel to the wheel steering angle. After the user releases the virtual steering wheel, the virtual steering wheel automatically aligns substantially in real time or in X seconds, and X may be a value preset by a developer.

Figure 10:
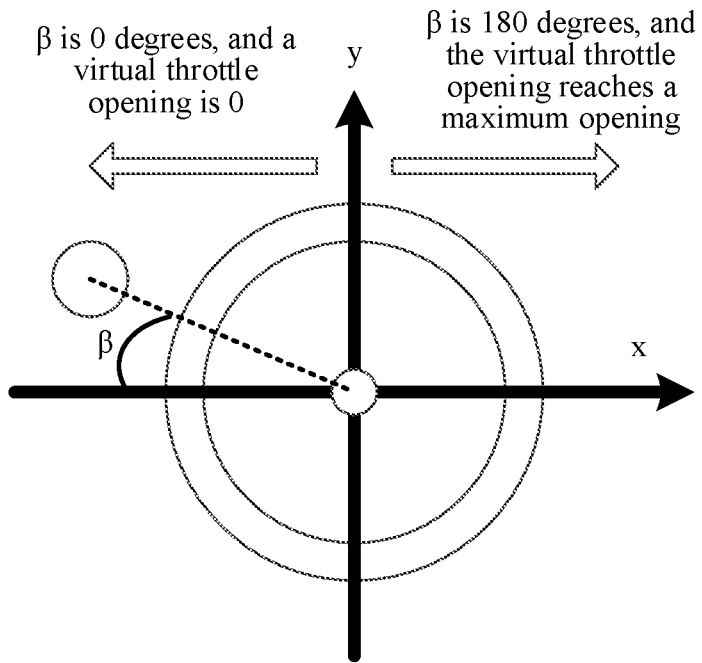
FIG. 10 is a schematic view illustrating controlling a virtual throttle opening through a virtual control involved in the embodiment shown in FIG. 6.

FIG. 10 shows a schematic diagram of controlling a virtual throttle opening through a virtual control involved in an embodiment of the disclosure. As shown in FIG. 10, the second virtual control is a virtual dashboard, and the user may touch a region in which the virtual dashboard is located and slide left or right to adjust the virtual throttle opening of the virtual vehicle. Specifically, a direction of an operation position of the touch and slide operation relative to a central point of the virtual dashboard may be represented by using an angle between a connecting line between the operation position of the touch and slide operation and the central point of the virtual dashboard and an x axis or y axis in a plane coordinate system. For example, in FIG. 10, a rectangular coordinate system is established by using the central point of the virtual dashboard as an origin, a transverse direction as an x-axis direction, and a longitudinal direction as a y-axis direction, and an angle β between the connecting line (a dotted line in FIG. 10) between the operation position of the touch and slide operation and the central point of the virtual dashboard and the x axis indicates a direction of the operation position of the touch and slide operation relative to the central point of the virtual dashboard. A larger absolute value of the angle β indicates a larger virtual throttle opening of a corresponding virtual vehicle, when the angle β is 0 degrees, the virtual throttle opening is also 0, and when the angle β reaches 180 degrees, the virtual throttle opening reaches a maximum opening.

Alternatively, in FIG. 10, the terminal may obtain a transverse offset distance of the operation position of the touch and slide operation relative to a left vertex of the virtual dashboard, that is, a length of the connecting line, mapped to the x axis, between the operation position of the touch and slide operation and the left vertex of the virtual dashboard. A larger transverse offset distance indicates a larger virtual throttle opening of the corresponding virtual vehicle. When the transverse offset distance is 0, the virtual throttle opening is also 0, and when the transverse offset distance reaches or exceeds a diameter of the virtual dashboard, the virtual throttle opening reaches the maximum opening.

Further, to present an operation effect of the user more intuitively, in FIG. 10, a pointer of the virtual dashboard also rotates according to the angle β or the transverse offset distance by using a straight line perpendicular to the virtual dashboard and running through the central point of the virtual dashboard as an axis. When the terminal detects that the touch and slide operation ends, the terminal may point the pointer to the leftmost or the rightmost in a preset duration. In terms of user operations, when the user touches and holds the virtual dashboard to slide left or right or obliquely, the user may control a speed and an acceleration of the virtual vehicle, and the pointer in the virtual dashboard may rotate along with the slide position of the user. After the user releases the virtual dashboard, the pointer automatically resets substantially in real time or in Y seconds, and Y may be a value preset by a developer.

Optionally, when the at least one primary virtual control includes a single third virtual control, the specified operation may include a third operation performed from a region in which the third virtual control is located, and the terminal may obtain the steering angle and the virtual throttle opening of the virtual vehicle according to an operation position of the third operation.

In an example implementation, the terminal may obtain the steering angle of the virtual vehicle according to a directional angle of the operation position of the third operation relative to a central position of the third virtual control, or obtain the steering angle of the virtual vehicle according to a transverse offset distance of the operation position of the third operation relative to a central position of the third virtual control; and obtain the virtual throttle opening of the virtual vehicle according to a distance of the operation position of the third operation relative to the central position of the third virtual control.

Figure 11:
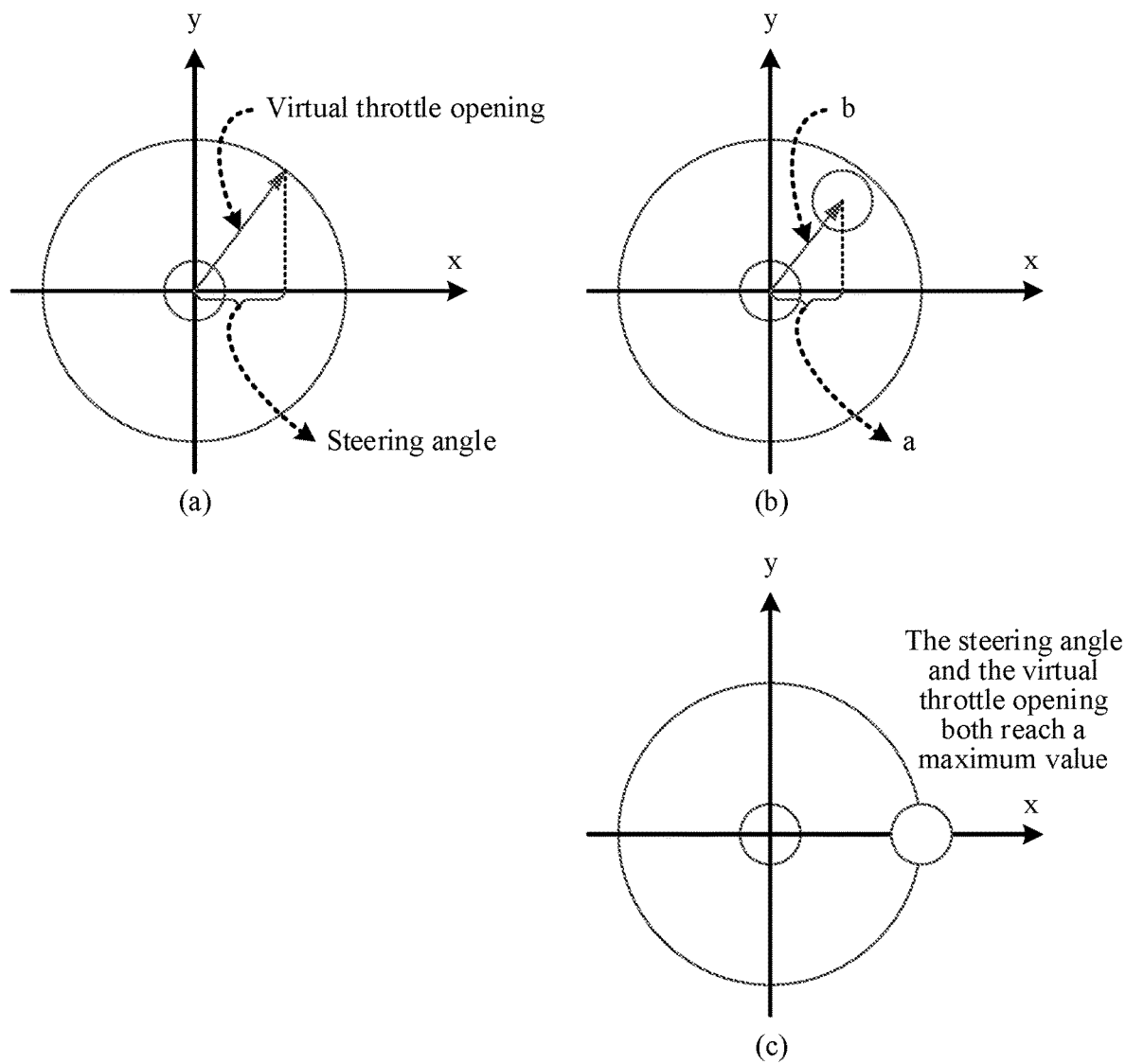
FIG. 11 is a schematic view illustrating controlling a steering angle and a virtual throttle opening through a virtual control involved in the embodiment shown in FIG. 6.

For example, FIG. 11 shows a schematic diagram of controlling a steering angle and a virtual throttle opening through a virtual control involved in an embodiment of the disclosure. As shown in FIG. 11, the third virtual control is a virtual steering wheel, and the user may touch a region in which the virtual steering wheel is located and slide left or right to adjust the steering angle of the virtual vehicle. For a detailed adjustment process, reference may be made to the corresponding description in FIG. 9, and details are not repeated herein.

In addition, in FIG. 11, the terminal may determine the virtual throttle opening according to a distance between a position of the touch and slide operation of the user and a central point of the virtual steering wheel. When the straight-line distance is 0, the virtual throttle opening is 0, and when the straight-line distance reaches or exceeds a radius of the virtual steering wheel, the virtual throttle opening reaches a maximum opening. For example, as shown in the part (a), the part (b), and the part (c) in FIG. 11, the terminal determines the steering angle according to a transverse offset distance a between the position of the touch and slide operation and the central point of the virtual steering wheel, and determines the virtual throttle opening according to a straight-line distance b between the position of the touch and slide operation and the central point of the virtual steering wheel. When the position of the touch and slide operation coincides with a right vertex of the virtual steering wheel, or rightward exceeds a right vertex of the virtual steering wheel, the steering angle and the virtual throttle opening of the virtual vehicle both reach a maximum value.

In addition, when the at least one primary virtual control includes a single third virtual control, if the position of the touch and slide operation is located in an upper half part of the virtual steering wheel, the terminal may determine that the virtual vehicle is moving forward, and if the position of the touch and slide operation is located in a lower half part of the virtual steering wheel, the terminal may determine that the virtual vehicle is moving backward. Specifically, in FIG. 11, a rectangular coordinate system is established by using the central point of the virtual steering wheel as an origin, a transverse direction as an x-axis direction, and a longitudinal direction as a y-axis direction. A radial distance by which the center of the virtual steering wheel is dragged by a user operation away from a circle center determines the virtual throttle opening, and an offset distance, on an x axis, of the center of the virtual steering wheel dragged by a user operation determines a steering amplitude, where the fourth quadrant and the first quadrant in the coordinate system are forward gear regions, and the second quadrant and the third quadrant are reverse gear regions. After the user releases the virtual steering wheel, the virtual steering wheel automatically aligns substantially in real time or in Z seconds, and Z may be a value preset by a developer.

Operation 603: Obtain a moving direction of the virtual vehicle according to the steering angle of the virtual vehicle, and obtain an acceleration and a maximum moving speed of the virtual vehicle according to the virtual throttle opening of the virtual vehicle.

In an embodiment of the disclosure, the terminal may calculate a moving direction in which the virtual vehicle is to be moved according to a current direction and a rotation angle of the virtual vehicle. At the same time, the terminal further determines a maximum moving speed of the virtual vehicle according to the virtual throttle opening of the virtual vehicle, and determines an acceleration to be applied to the virtual vehicle according to a current speed, the maximum moving speed, and the virtual throttle opening of the virtual vehicle.

Operation 604: Control the virtual vehicle to move according to the moving direction, the acceleration, and the maximum moving speed of the virtual vehicle.

For example, the terminal may control the virtual vehicle to move according to the determined moving direction and the acceleration until the virtual vehicle reaches the maximum moving speed.

Optionally, to further extend a control manner of the user for the virtual vehicle, in an embodiment of the disclosure, the display interface further includes an auxiliary virtual control, and the auxiliary virtual control includes at least one of a longitudinal attitude control, a sudden acceleration control, a brake control, and a reverse control that are overlaid on an upper layer of the scene picture.

Figure 12:
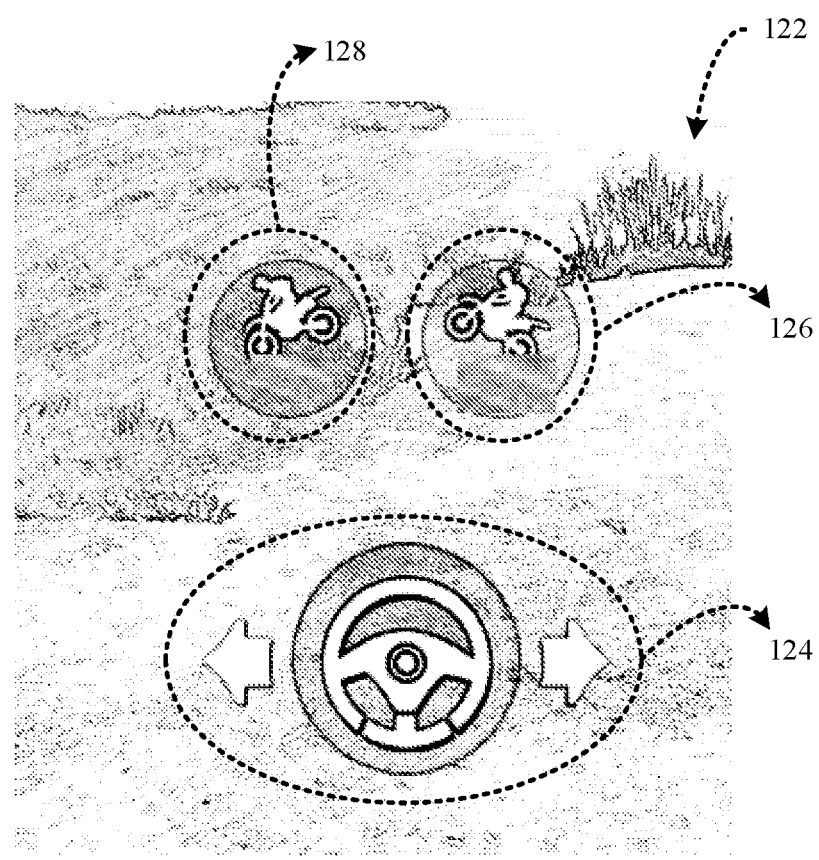
FIG. 12 is a partial schematic view illustrating a longitudinal attitude control involved in the embodiment shown in FIG. 6.

The longitudinal attitude control may be used for controlling a longitudinal attitude of the virtual vehicle. For example, FIG. 12 shows a partial schematic view illustrating a longitudinal attitude control involved in an embodiment of the disclosure. Using an example in which the virtual vehicle is a virtual motorcycle, as shown in FIG. 12, an operation region 122 of a display interface includes a primary virtual control 124 and two longitudinal attitude controls (the two controls are respectively a virtual control 126 and a virtual control 128), where the virtual control 126 is used for controlling the virtual motorcycle to ascend, and the virtual control 128 is used for controlling the virtual motorcycle to descend. According to the foregoing solution, two high-end operation modes of the ascent and the descent for the virtual vehicle (for example, a virtual motorcycle) are provided in the virtual scene in the disclosure, and the user may perform the vehicle ascent and/or descent operations when passing through a steep terrain to reduce a probability of a virtual vehicle turnover, thereby improving use experience of the virtual scene.

Figure 13:
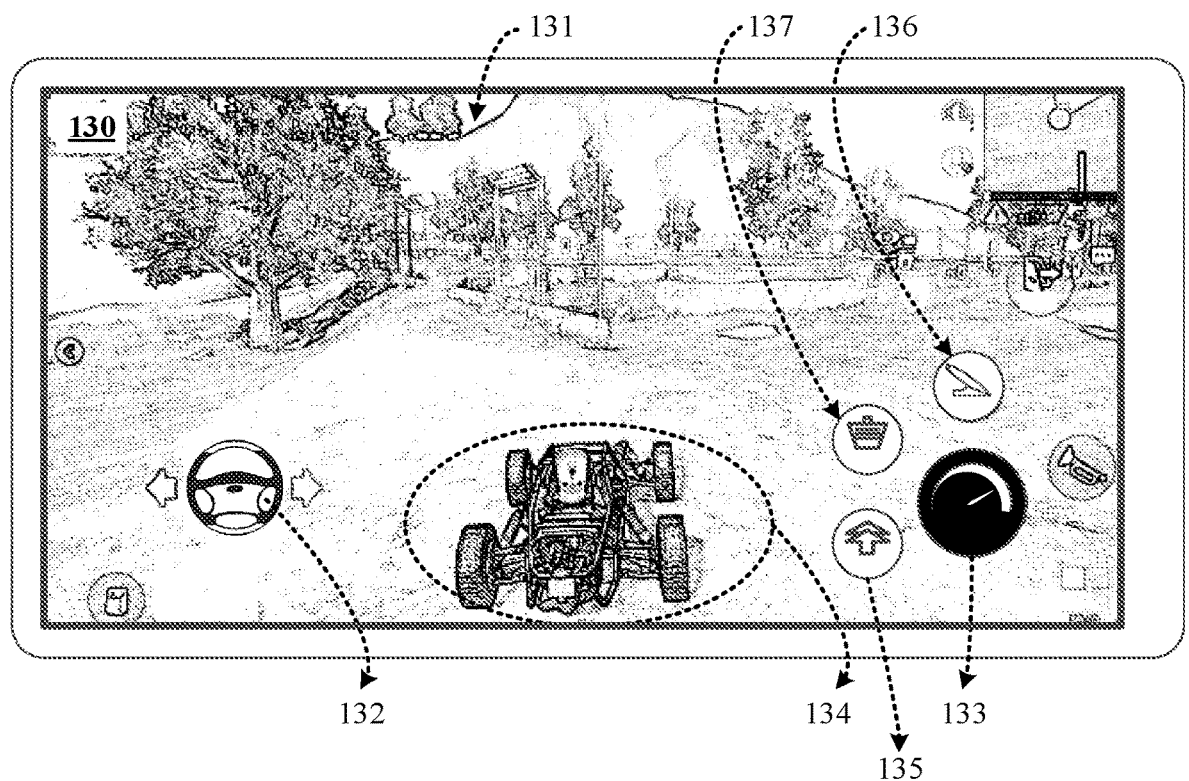
FIG. 13 is a schematic view illustrating virtual controls involved in the embodiment shown in FIG. 6.

In addition, FIG. 13 shows a schematic view illustrating virtual controls involved in an embodiment of the disclosure. As shown in FIG. 13, a display interface 130 includes a scene picture 131, a virtual control 132, and a virtual control 133, and a middle lower part of the scene picture 131 includes a virtual vehicle 134. The virtual control 132 is used for controlling a steering angle of the virtual vehicle 134, and the virtual control 133 is used for controlling a virtual throttle opening of the virtual vehicle 134. Other auxiliary virtual controls such as a sudden acceleration control 135, a brake control 136, and a reverse control 137 are further displayed around the virtual control 133.

The sudden acceleration control 135 may be used for controlling the virtual vehicle to suddenly accelerate to move. In an embodiment of the disclosure, when the terminal detects that the sudden acceleration control is triggered, the terminal may control the virtual vehicle to accelerate according to a maximum acceleration in a sudden acceleration mode to a maximum moving speed in the sudden acceleration mode. The maximum acceleration in the sudden acceleration mode may be greater than or equal to an acceleration at a maximum virtual throttle opening, or the maximum moving speed in the sudden acceleration mode may be greater than or equal to a maximum moving speed at the maximum virtual throttle opening.

The brake control 136 is used for controlling the virtual vehicle to brake. When the terminal detects that the brake control is triggered, the terminal may control the virtual vehicle to perform emergency braking by using a maximum brake deceleration.

The reverse control 137 is used for controlling the virtual vehicle to reverse.

Operation 606: Obtain a moving speed of the virtual vehicle, and adjust, in a case that the moving speed of the virtual vehicle is greater than a moving speed threshold, the scene picture to a picture of the virtual vehicle being observed in a predetermined viewing angle direction.

The predetermined viewing angle direction is a viewing angle direction in which the virtual vehicle in the virtual scene is observed by using a camera model, and the camera model is located above a rear portion of the virtual vehicle.

The scene picture in the display interface may be a picture of a virtual object (for example, a virtual character or a virtual vehicle) that is being observed in the virtual scene by using one viewing angle direction in the virtual scene, and the viewing angle direction is a viewing angle direction in which the virtual object in the virtual scene is observed by using a camera model.

The camera model is a three-dimensional model located around the virtual object in the virtual scene. When a first-person viewing angle is used, the camera model is located at an observation position of the virtual object. For example, when the virtual object is a virtual vehicle, the camera model is located near or in a cockpit of the virtual vehicle, and when the virtual object is a virtual character, the camera model is located near or at the head of the virtual character. When a third-person viewing angle is used, the camera model may be located behind the virtual object and bound to the virtual object, or may be located at any position away from the virtual object by a preset distance. The virtual object located in the virtual scene may be observed from different angles through the camera model. Optionally, when the third-person viewing angle is a first-person over-shoulder viewing angle, the camera model is located above a rear portion of the virtual object (for example, a virtual vehicle). Optionally, the camera model is not displayed in the virtual scene, that is, the camera model may not be recognized in the virtual scene displayed in the user interface.

Description is made by using an example in which the camera model is located at any position away from the virtual object by a preset distance. Optionally, one virtual object corresponds to one camera model, and the camera model may rotate around the virtual object as a center of rotation (a rotation center), for example, the camera model is rotated with respect to any point of the virtual object as the rotation center. During rotation, the camera model is not only rotated, but also displaced. During rotation, a distance between the camera model and the rotation center may remain unchanged, that is, the camera model may be rotated on a surface of a sphere with respect to the rotation center as a sphere center. Any point of the virtual object may be any point of the virtual object or around the virtual object, for example, the any point of the virtual object may be a cockpit, a passenger seat, a back seat, a center of the virtual vehicle, or any point around the virtual object, or the any point of the virtual object may be the head or the torso of the virtual object, or any point around the virtual object. The point of the rotation center is not limited in the embodiments of the disclosure. Optionally, when the camera model observes the virtual object, the viewing angle direction of the camera model is a direction in which a vertical line on a tangent plane of a spherical surface on which the camera model is located points to the virtual object.

Optionally, the camera model may alternatively observe the virtual object at a preset angle in different directions of the virtual object.

Figure 14:
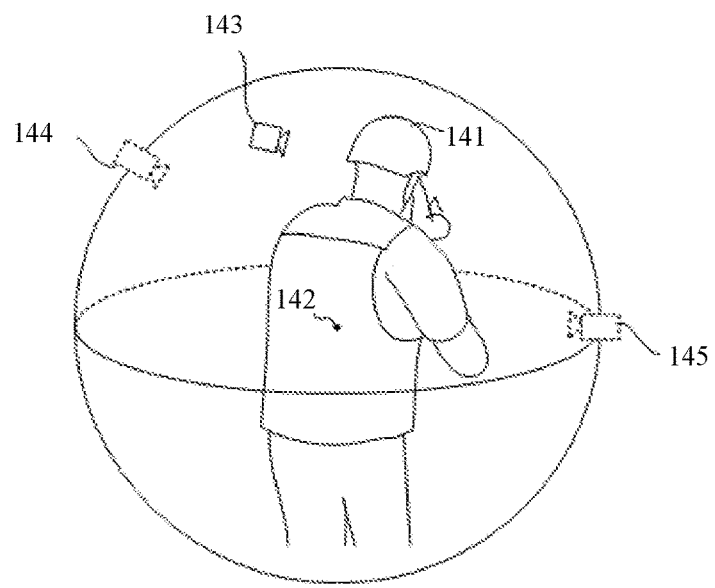
FIG. 14 is a schematic view illustrating a camera model involved in the embodiment shown in FIG. 6.

For example, FIG. 14 shows a schematic diagram of a camera model involved in an embodiment of the disclosure. A point in a virtual object 141 is determined as a rotation center 142, and the camera model rotates around the rotation center 142. Optionally, the camera model is configured with an initial position, and the initial position is a position above a rear portion of the virtual object (for example, a rear position of the brain). For example, as shown in FIG. 14, the initial position is a position 143, and when the camera model rotates to a position 144 or a position 145, a viewing angle direction of the camera model changes as the camera model rotates.

In FIG. 14, description is made by using an example in which the virtual object is a virtual character. In an embodiment of the disclosure, the virtual object 141 may alternatively be a virtual vehicle in a virtual scene, or the virtual object may be a virtual object in any other form and controlled by the user, such as a virtual animal.

Figure 15:
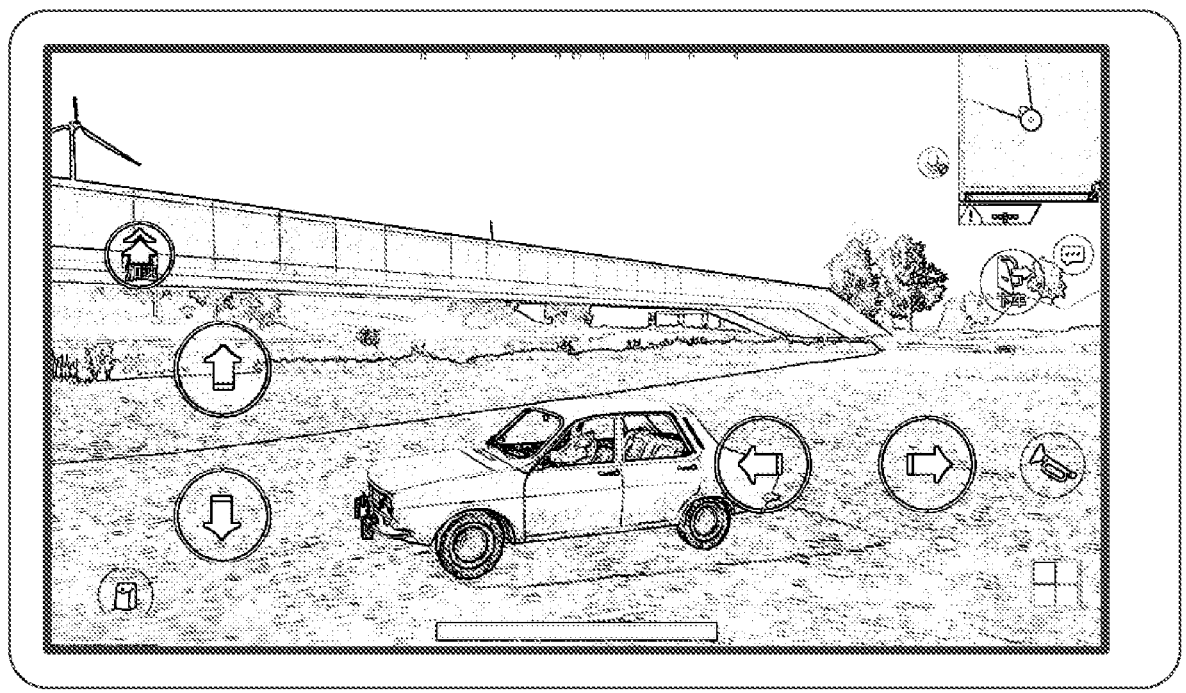
FIG. 15 and FIG. 16 are schematic views illustrating scene pictures with two different viewing angles involved in the embodiment shown in FIG. 6.
Figure 16:
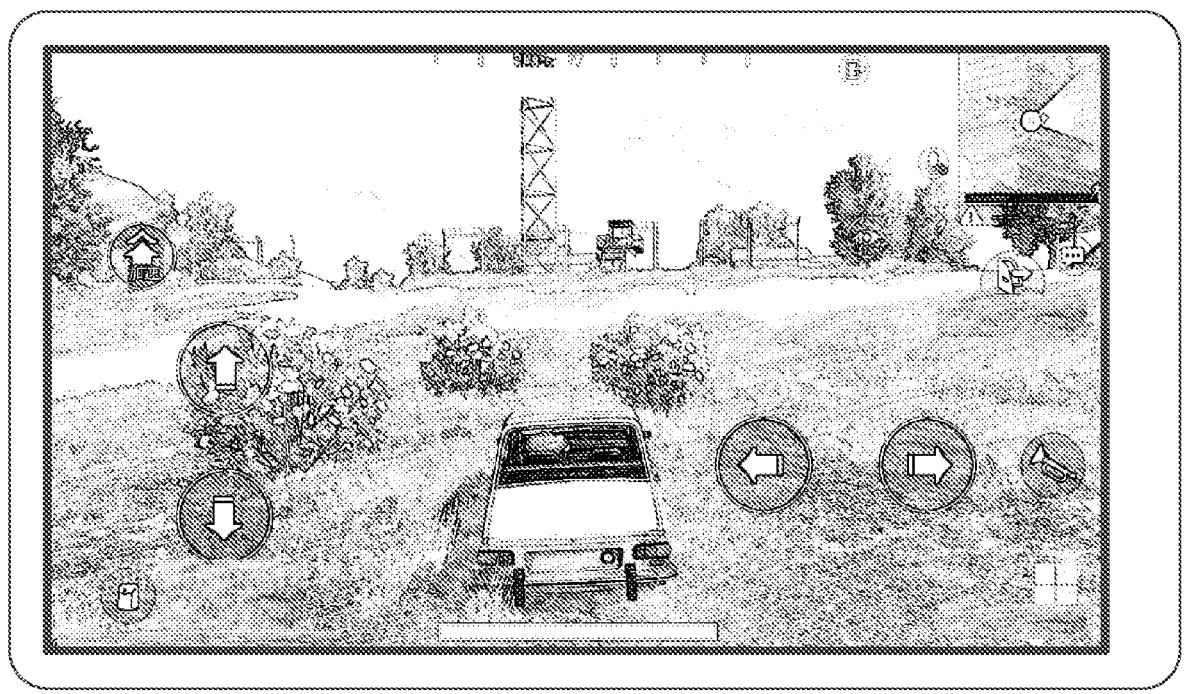

In an embodiment of the disclosure, a follow camera mode may be provided. For example, FIG. 15 and FIG. 16 show schematic views illustrating two scene pictures with different viewing angles involved in an embodiment of the disclosure. In FIG. 15, the camera model is located on a left side of the virtual vehicle, and the terminal displays the scene picture by using a viewing angle at which the virtual vehicle is observed from the left side of the virtual vehicle. In FIG. 16, the camera model is located above a rear position of the virtual vehicle, and the terminal displays the scene picture by using a viewing angle at which the virtual vehicle is observed from the above and behind of the virtual vehicle. In the follow camera mode, when the moving speed of the virtual vehicle reaches a specific speed threshold (for example, 20 kilometers per hour), for example, when the user taps acceleration, a viewing angle of the scene picture automatically changes to the rear (changes from FIG. 15 to FIG. 16), to help the user to focus on the road conditions ahead in the virtual scene in time at an emergency moment (acceleration).

In another example implementation, the disclosure further provides a free camera mode. In the free camera mode, when the moving speed of the virtual vehicle changes, the terminal may maintain a position of the camera model relative to the virtual vehicle unchanged, to help the user to observe conditions on the side of or behind the virtual vehicle.

Optionally, in an embodiment of the disclosure, when a duration of the moving speed of the virtual vehicle being greater than a moving speed threshold is greater than a preset duration threshold, the terminal may adjust the scene picture to a picture of the virtual vehicle being observed in a predetermined viewing angle direction.

Figure 17:
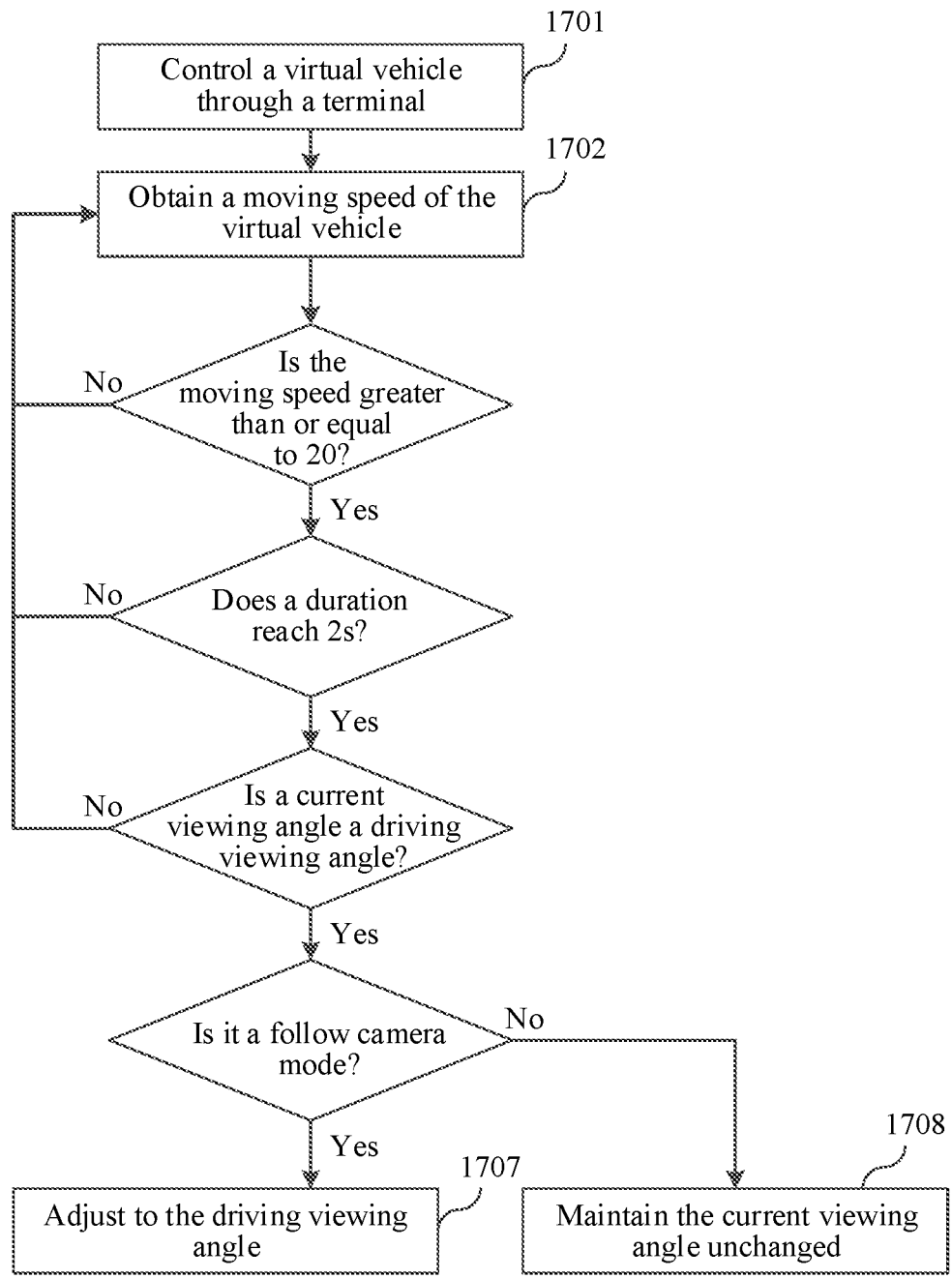
FIG. 17 is a flowchart illustrating a viewing angle adjustment process involved in the embodiment shown in FIG. 6.

For example, FIG. 17 shows a schematic flowchart of a viewing angle adjustment process involved in an embodiment of the disclosure. As shown in FIG. 17, the user controls a virtual vehicle through a terminal (S1701), and the terminal obtains a moving speed of the virtual vehicle (S1702), to determine whether the moving speed is greater than or equal to a threshold speed (e.g., 20 kilometer/hour). If the moving speed is less than 20 km/h, return to S1702, and if the moving speed is greater than or equal to 20 km/h, continue to determine whether a duration of the moving speed being greater than or equal to 20 km/h reaches 2 seconds. If the duration of the moving speed being greater than or equal to 20 km/h does not reach 2 seconds, return to S1702, and if the duration of the moving speed being greater than or equal to 20 reaches 2 seconds, determine whether a current viewing angle is a driving viewing angle, where in the driving viewing angle, the scene picture is a picture of the virtual vehicle being observed in a predetermined viewing angle direction. If the current viewing angle is the driving viewing angle, return to S1702; otherwise continue to determine whether a current mode is a follow camera mode, and if yes, adjust the current viewing angle to the driving viewing angle (S1707); otherwise maintain the current viewing angle unchanged (S1708).

Optionally, the user may further freely switch the viewing angle during acceleration. For example, the user may switch the current viewing angle to the driving viewing angle or a non-driving viewing angle by sliding in the display interface of the virtual scene.

Optionally, in an embodiment of the disclosure, in addition to the foregoing mode of controlling the steering angle and the virtual throttle opening of the virtual vehicle through a plurality of virtual controls and the mode of controlling the steering angle and the virtual throttle opening of the virtual vehicle through one single virtual control, the disclosure may further provide other control modes, for example, a mode in which the user taps buttons by using the left and right hands to control the movement and direction of the vehicle, a mode in which the user touches by using the left hand to directly control the virtual vehicle to rotate to various different directions, and a mode in which the user controls the virtual vehicle to swing left or right by using the left or right joystick, and controls the virtual vehicle to move forward or backward by using a left or right slider. The terminal may provide a control mode selection interface for the user to select one control mode from a plurality of control modes.

Figure 18:
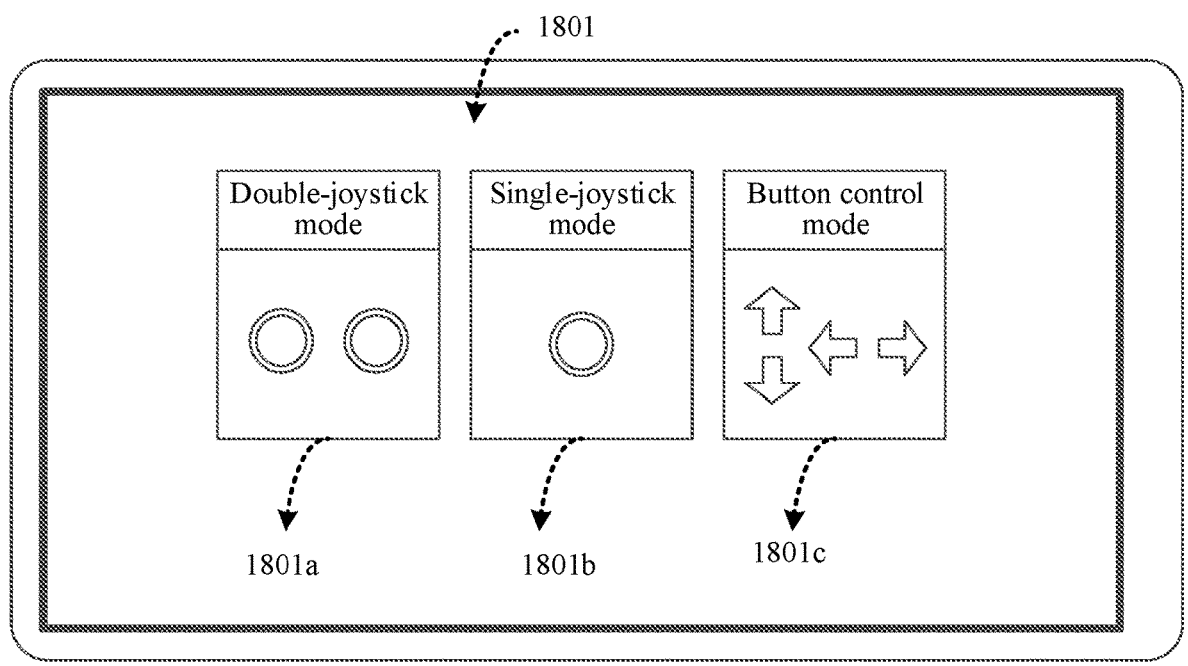
FIG. 18 is a schematic view illustrating a control mode selection interface involved in the embodiment shown in FIG. 6.

For example, FIG. 18 shows a schematic diagram of a control mode selection interface involved in an embodiment of the disclosure. In FIG. 18, a control mode selection interface 1801 includes three mode options, which are respectively a double-joystick control mode option 1801a corresponding to controlling the steering angle and the virtual throttle opening through two virtual controls, a single-joystick control mode option 1801b corresponding to controlling the steering angle and the virtual throttle opening through one single virtual control, and a button control mode option 1801c corresponding to controlling the steering angle and an advancing direction through upper, lower, left and right virtual buttons, and the user may perform an operation for the selection of the three options to enable one control mode.

In an embodiment of the disclosure, the virtual control is overlay-displayed on the upper layer of the scene picture of the virtual scene, and the steering angle and the virtual throttle opening of the virtual vehicle in the virtual scene are determined according to an operation of the user on the virtual control, thereby implementing the control of both the direction and the speed of the virtual vehicle, improving a control effect on the virtual vehicle, and providing more options and operation space for the control operations of the virtual vehicle.

In addition, according to the solution shown in an embodiment of the disclosure, at least one auxiliary virtual control of a longitudinal attitude control, a sudden acceleration control, a brake control, and a reverse control is further provided, to further expand the operability of the virtual vehicle.

In addition, according to the solution shown in an embodiment of the disclosure, a function of adjusting the viewing angle while controlling the virtual vehicle is provided, thereby automatically adjusting the viewing angle according to the moving speed of the virtual vehicle and further expanding the operability of the virtual vehicle.

Figure 19:
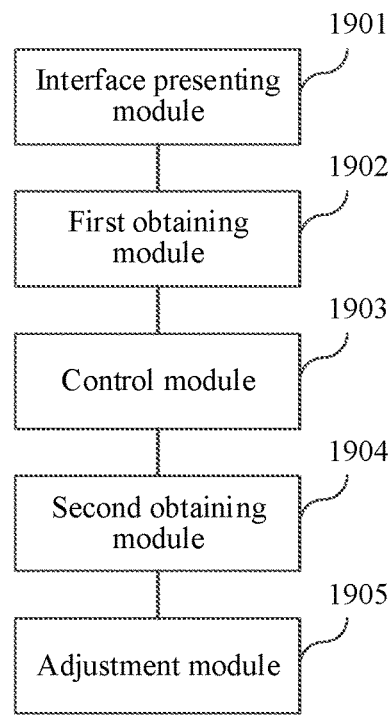
FIG. 19 is a structural block diagram of a terminal according to an example embodiment of the disclosure.

FIG. 19 is a structural block diagram of a terminal according to an example embodiment. The terminal may perform all or some operations performed by a terminal in the method shown in the embodiment corresponding to FIG. 4 or FIG. 6. The terminal may include:

an interface presenting module 1901, configured to present a display interface of an application program, the display interface including a scene picture of a virtual scene and at least one primary virtual control, and the at least one primary virtual control being overlaid on an upper layer of the scene picture;

a first obtaining module 1902, configured to obtain, in response to detecting a specified operation on the at least one primary virtual control, at least one of a steering angle and a virtual throttle opening of a virtual vehicle in the scene picture according to the specified operation, the virtual throttle opening and a speed factor of the virtual vehicle being positively correlated, and the speed factor including at least one of an acceleration and a maximum moving speed; and a control module 1903, configured to control the virtual vehicle to move according to the obtained steering angle and virtual throttle opening of the virtual vehicle.

Optionally, the control module 1903 is configured to:

obtain a moving direction of the virtual vehicle according to the steering angle of the virtual vehicle;

obtain an acceleration and a maximum moving speed of the virtual vehicle according to the virtual throttle opening of the virtual vehicle; and control the virtual vehicle to move according to the moving direction, the acceleration, and the maximum moving speed of the virtual vehicle.

Optionally, the at least one primary virtual control includes a first virtual control and a second virtual control, and the specified operation includes a first operation performed from a region in which the first virtual control is located and a second operation performed from a region in which the second virtual control is located; and the first obtaining module 1902 is configured to:

obtain the steering angle of the virtual vehicle according to an operation position of the first operation; and obtain the virtual throttle opening of the virtual vehicle according to an operation position of the second operation.

Optionally, in the case of obtaining the steering angle of the virtual vehicle according to an operation position of the first operation, the first obtaining module 1902 is configured to:

obtain the steering angle of the virtual vehicle according to a directional angle of the operation position of the first operation relative to a central position of the first virtual control; or obtain the steering angle of the virtual vehicle according to a transverse offset distance of the operation position of the first operation relative to a central position of the first virtual control; and in the case of obtaining the virtual throttle opening of the virtual vehicle according to an operation position of the second operation, the first obtaining module 1902 is configured to:

obtain the virtual throttle opening of the virtual vehicle according to a directional angle of the operation position of the second operation relative to a central position of the second virtual control; or obtain the virtual throttle opening of the virtual vehicle according to a transverse offset distance of the operation position of the second operation relative to a left vertex or a right vertex of the second virtual control.

Optionally, the at least one primary virtual control includes a third virtual control, and the specified operation includes a third operation performed from a region in which the third virtual control is located; and the first obtaining module 1902 is configured to obtain the steering angle and the virtual throttle opening of the virtual vehicle according to an operation position of the third operation.

Optionally, the first obtaining module 1902 is configured to:

obtain the steering angle of the virtual vehicle according to a directional angle of the operation position of the third operation relative to a central position of the third virtual control; or obtain the steering angle of the virtual vehicle according to a transverse offset distance of the operation position of the third operation relative to a central position of the third virtual control; and obtain the virtual throttle opening of the virtual vehicle according to a straight-line distance of the operation position of the third operation relative to the central position of the third virtual control.

Optionally, the display interface further includes an auxiliary virtual control, and the auxiliary virtual control includes at least one of a longitudinal attitude control, a sudden acceleration control, a brake control, and a reverse control that are overlaid on the upper layer of the scene picture, where the longitudinal attitude control is used for controlling a longitudinal attitude of the virtual vehicle;

the sudden acceleration control is used for controlling the virtual vehicle to suddenly accelerate to move;

the brake control is used for controlling the virtual vehicle to brake; and the reverse control is used for controlling the virtual vehicle to reverse.

Optionally, the terminal further includes:

a second obtaining module 1904, configured to obtain a moving speed of the virtual vehicle; and an adjustment module 1905, configured to adjust, in a case that the moving speed of the virtual vehicle is greater than a moving speed threshold, the scene picture to a picture of the virtual vehicle being observed in a predetermined viewing angle direction, the predetermined viewing angle direction being a viewing angle direction in which the virtual vehicle is observed in the virtual scene by using a camera model, and the camera model being located above a rear portion of the virtual vehicle.

Figure 20:
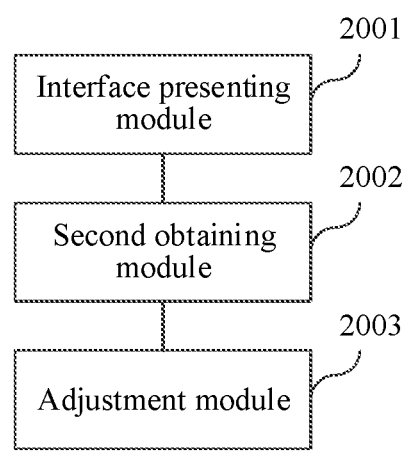
FIG. 20 is a structural block diagram of a terminal according to an example embodiment of the disclosure.

FIG. 20 is a structural block diagram of a terminal according to an example embodiment. The terminal may perform all or some operations performed by a terminal in the method shown in the embodiment corresponding to FIG. 3 or FIG. 6. The terminal may include:

an interface presenting module 2001, configured to present a display interface of an application program, the display interface including a scene picture of a virtual scene, and the virtual scene including a virtual vehicle;

a second obtaining module 2002, configured to obtain a moving speed of the virtual vehicle; and an adjustment module 2003, configured to adjust, in a case that the moving speed of the virtual vehicle is greater than a moving speed threshold, the scene picture to a picture of the virtual vehicle being observed in a predetermined viewing angle direction, the predetermined viewing angle direction being a viewing angle direction in which the virtual vehicle is observed in the virtual scene by using a camera model, and the camera model being located above a rear portion of the virtual vehicle.

Optionally, the display interface further includes at least one primary virtual control, the at least one primary virtual control is overlaid on an upper layer of the scene picture, and the terminal further includes:

a first obtaining module, configured to obtain, in response to detecting a specified operation on the at least one primary virtual control, a steering angle and a virtual throttle opening of the virtual vehicle according to the specified operation, the virtual throttle opening and a speed factor of the virtual vehicle being positively correlated, and the speed factor including at least one of an acceleration and a maximum moving speed; and a control module 2003, configured to control the virtual vehicle to move according to the obtained steering angle and virtual throttle opening of the virtual vehicle.

Optionally, the display interface further includes an auxiliary virtual control, and the auxiliary virtual control includes at least one of a longitudinal attitude control, a sudden acceleration control, a brake control, and a reverse control that are overlaid on the upper layer of the scene picture, where the longitudinal attitude control is used for controlling a longitudinal attitude of the virtual vehicle;

the sudden acceleration control is used for controlling the virtual vehicle to suddenly accelerate to move;

the brake control is used for controlling the virtual vehicle to brake; and the reverse control is used for controlling the virtual vehicle to reverse.

Figure 21:
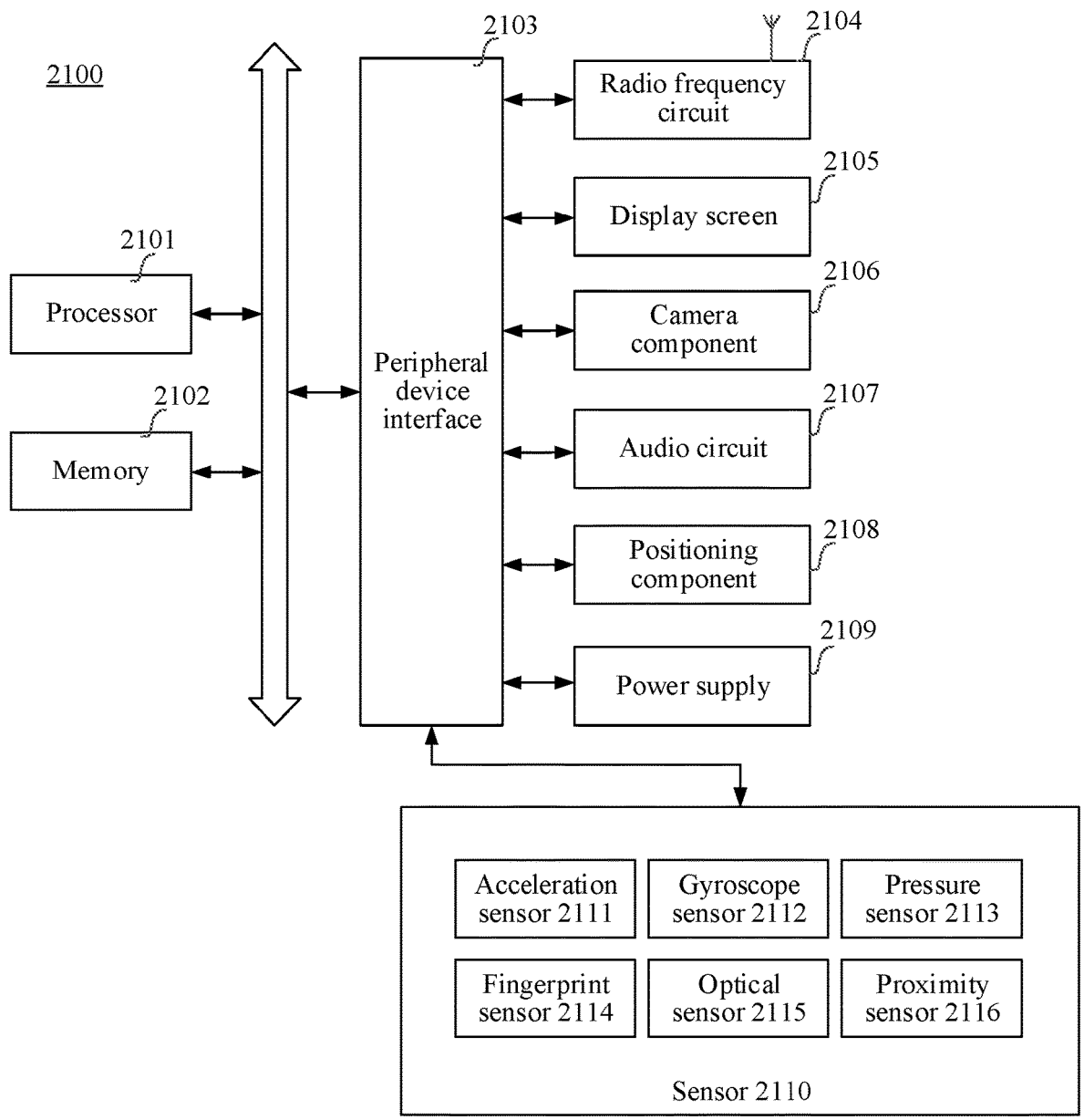
FIG. 21 is a structural block diagram of a computer device according to an example embodiment of the disclosure.

FIG. 21 is a structural block diagram of a computer device 2100 according to an example embodiment. The computer device 2100 may be a user terminal, such as a smartphone, a tablet computer, a moving picture experts group audio layer III (MP3) player, a moving picture experts group audio layer IV (MP4) player, a notebook computer, or a desktop computer. The computer device 2100 may also be referred to as another name such as user equipment, a portable terminal, a laptop terminal, or a desktop terminal.

Generally, the computer device 2100 includes a processor 2101 and a memory 2102.

The processor 2101 may include one or more processing cores, for example, may be a 4-core processor or an 8-core processor. The processor 2101 may be implemented by using at least one hardware form of digital signal processing (DSP), a field-programmable gate array (FPGA), and a programmable logic array (PLA). The processor 2101 may alternatively include a main processor and a coprocessor. The main processor is a processor configured to process data in an awake state, also referred to as a central processing unit (CPU), and the coprocessor is a low-power processor configured to process data in a standby state. In some embodiments, the processor 2101 may be integrated with a graphics processing unit (GPU). The GPU is configured to be responsible for rendering and drawing content to be displayed by a display screen. In some embodiments, the processor 2101 may further include an artificial intelligence (AI) processor. The AI processor is configured to process a calculation operation related to machine learning.

The memory 2102 may include one or more computer-readable storage media. The computer-readable storage medium may be non-transient. The memory 2102 may further include a high-speed random access memory and a non-volatile memory such as one or more magnetic disk storage devices and a flash storage device. In some embodiments, the non-transient computer-readable storage medium in the memory 2102 is configured to store at least one instruction. The at least one instruction is executed by the processor 2101 to perform the virtual vehicle control method in a virtual scene provided in the method embodiment in the disclosure.

In some embodiments, the computer device 2100 further optionally includes a peripheral device interface 2103 and at least one peripheral device. The processor 2101, the memory 2102, and the peripheral device interface 2103 may be connected through a bus or a signal cable. Each peripheral device may be connected to the peripheral device interface 2103 through a bus, a signal cable, or a circuit board. Specifically, the peripheral device includes: at least one of a radio frequency (RF) circuit 2104, a touch display screen 2105, a camera component 2106, an audio circuit 2107, a positioning component 2108, and a power supply 2109.

The peripheral device interface 2103 may be configured to connect at least one peripheral device related to input/output (I/O) to the processor 2101 and the memory 2102. In some embodiments, the processor 2101, the memory 2102, and the peripheral device interface 2103 are integrated into the same chip or circuit board. In some other embodiments, any one or two of the processor 2101, the memory 2102, and the peripheral device interface 2103 may be implemented on an independent chip or circuit board, and the implementation is not limited in an embodiment.

The RF circuit 2104 is configured to receive and transmit an RF signal, also referred to as an electromagnetic signal. The RF circuit 2104 communicates with a communications network and another communication device by using the electromagnetic signal. The RF circuit 2104 converts an electrical signal into an electromagnetic signal for transmission, or converts a received electromagnetic signal into an electrical signal. Optionally, the RF circuit 2104 includes an antenna system, an RF transceiver, one or more amplifiers, a tuner, an oscillator, a digital signal processor, a codec chip set, a subscriber identity module card, and the like. The RF circuit 2104 may communicate with another terminal by using a wireless communication protocol. The wireless communication protocol includes, but is not limited to: a world wide web, a metropolitan area network, an intranet, generations of mobile communication networks (e.g., 2G, 3G, 4G, and 5G), a wireless local area network and/or a wireless fidelity (Wi-Fi) network. In some embodiments, the RF circuit 2104 may also include a circuit related to near field communication (NFC). Examples of the wireless communication protocol are not limited in the disclosure.

The display screen 2105 is configured to display a user interface (UI). The UI may include a graph, a text, an icon, a video, and any combination thereof. When the display screen 2105 is a touch display screen, the display screen 2105 is further capable of acquiring a touch signal on or above a surface of the display screen 2105. The touch signal may be inputted to the processor 2101 for processing as a control signal. In this case, the display screen 2105 may be further configured to provide a virtual button and/or a virtual keyboard, which is also referred to as a soft button and/or a soft keyboard. In some embodiments, there is one display screen 2105, disposed on a front panel of the computer device 2100. In some other embodiments, there may be at least two display screens 2105, respectively disposed on different surfaces of the computer device 2100 or designed in a foldable shape. In still some other embodiments, the display screen 2105 may be a flexible display screen, disposed on a curved surface or a folded surface of the computer device 2100. In an embodiment, the display screen 2105 may be further set in a non-rectangular irregular pattern, namely, a special-shaped screen. The display screen 2105 may be prepared by using materials such as a liquid crystal display (LCD), an organic light-emitting diode (OLED), or the like.

The camera component 2106 is configured to acquire a picture or a video. Optionally, the camera component 2106 includes a front-facing camera and a rear-facing camera. Generally, the front-facing camera is disposed on a front panel of the terminal, and the rear-facing camera is disposed on a back surface of the terminal. In some embodiments, there are at least two rear-facing cameras, each being any one of a main camera, a depth of field camera, a wide-angle camera, and a telephoto camera, to implement a Bokeh function through fusion of the main camera and the depth of field camera, panoramic photo shooting and virtual reality (VR) shooting functions through fusion of the main camera and wide-angle camera, or another fusion shooting function. In some embodiments, the camera component 2106 may further include a flash. The flash may be a single color temperature flash, or may be a double color temperature flash. The double color temperature flash refers to a combination of a warm flash and a cold flash, and may be configured to perform light ray compensation at different color temperatures.

The audio circuit 2107 may include a microphone and a loudspeaker. The microphone is configured to: acquire sound waves of a user and an environment, and convert the sound waves into electrical signals and input the electrical signals into the processor 2101 for processing, or input the electrical signals into the RF circuit 2104 to implement speech communication. For the purpose of stereo sound collection or noise reduction, there may be a plurality of microphones, respectively disposed at different parts of the computer device 2100. The microphone may be further an array microphone or an omnidirectional collection microphone. The loudspeaker is configured to convert electrical signals from the processor 2101 or the RF circuit 2104 into sound waves. The loudspeaker may be a conventional thin-film loudspeaker or a piezoelectric ceramic loudspeaker. When the loudspeaker is the piezoelectric ceramic loudspeaker, electric signals not only can be converted into sound waves that can be heard by human, but also can be converted into sound waves that cannot be heard by human for ranging and the like. In some embodiments, the audio circuit 2107 may further include an earphone jack.

The positioning component 2108 is configured to position a current geographic location of the computer device 2100, to implement navigation or a location based service (LBS). The positioning component 2108 may be a positioning component based on the Global Positioning System (GPS) of the United States, the BeiDou Navigation Satellite System (BDS) of China, the GLONASS System of Russia, or the GALILEO System of the European Union.

The power supply 2109 is configured to supply power to components in the computer device 2100. The power supply 2109 may be an alternating current, a direct current, a disposable battery, or a rechargeable battery. When the power supply 2109 includes the rechargeable battery, the rechargeable battery may be a wired rechargeable battery or a wireless rechargeable battery. The wired rechargeable battery is a battery charged through a wired circuit, and the wireless rechargeable battery is a battery charged through a wireless coil. The rechargeable battery may further be configured to support a quick charge technology.

In some embodiments, the computer device 2100 further includes one or more sensors 2110. The one or more sensors 2110 include, but are not limited to: an acceleration sensor 2111, a gyroscope sensor 2112, a pressure sensor 2113, a fingerprint sensor 2114, an optical sensor 2115, and a proximity sensor 2116.

The acceleration sensor 2111 may detect accelerations on three coordinate axes of a coordinate system established by the computer device 2100. For example, the acceleration sensor 2111 may be configured to detect components of gravity acceleration on the three coordinate axes. The processor 2101 may control, according to a gravity acceleration signal collected by the acceleration sensor 2111, the touch display screen 2105 to display the user interface in a frame view or a portrait view. The acceleration sensor 2111 may be further configured to collect game or user motion data.

The gyroscope sensor 2112 may detect a body direction and a rotation angle of the computer device 2100. The gyroscope sensor 2112 may cooperate with the acceleration sensor 2111 to collect a 3D action by the user on the computer device 2100. The processor 2101 may implement the following functions according to the data collected by the gyroscope sensor 2112: motion sensing (such as changing the UI according to a tilt operation of the user), picture stabilization during shooting, game control, and inertial navigation.

The pressure sensor 2113 may be disposed on a side frame of the computer device 2100 and/or a lower layer of the touch display screen 2105. When the pressure sensor 2113 is disposed on the side frame of the computer device 2100, a holding signal of the user on the computer device 2100 may be detected. The processor 2101 performs left and right hand recognition or a quick operation according to the holding signal collected by the pressure sensor 2113. When the pressure sensor 2113 is disposed on the lower layer of the touch display screen 2105, the processor 2101 controls an operable control on the UI interface according to a pressure operation of the user on the touch display screen 2105. The operable control includes at least one of a button control, a scroll bar control, an icon control and a menu control.

The fingerprint sensor 2114 is configured to collect a fingerprint of the user. The processor 2101 identifies an identity of the user according to the fingerprint collected by the fingerprint sensor 2114, or the fingerprint sensor 2114 identifies an identity of the user according to the collected fingerprint. When the identity of the user is identified as a trusted identity, the processor 2101 authorizes the user to perform a related sensitive operation. The sensitive operation includes unlocking a screen, viewing encryption information, downloading software, payment, changing settings, and the like. The fingerprint sensor 2114 may be disposed on a front face, a back face, or a side face of the computer device 2100. When a physical button or a vendor logo is disposed on the computer device 2100, the fingerprint sensor 2114 may be integrated together with the physical button or the vendor logo.

The optical sensor 2115 is configured to collect ambient light intensity. In an embodiment, the processor 2101 may control the display brightness of the touch display screen 2105 according to the ambient light intensity collected by the optical sensor 2115. Specifically, when the ambient light intensity is relatively high, the display brightness of the touch display screen 2105 is turned up. When the ambient light intensity is relatively low, the display brightness of the touch display screen 2105 is turned down. In another embodiment, the processor 2101 may further dynamically adjust a camera parameter of the camera component 2106 according to the ambient light intensity collected by the optical sensor 2115.

The proximity sensor 2116, also referred to as a distance sensor, may be disposed on the front panel of the computer device 2100. The proximity sensor 2116 is configured to collect a distance between a front face of the user and the front face of the computer device 2100. In an embodiment, when the proximity sensor 2116 detects that the distance between the front face of the user and the front face of the computer device 2100 is gradually decreased, the processor 2101 controls the touch display screen 2105 to switch from a screen-on state to a screen-off state. When the proximity sensor 2116 detects that the distance between the front face of the user and the front face of the computer device 2100 is gradually increased, the processor 2101 controls the touch display screen 2105 to switch from the screen-off state to the screen-on state.

A person skilled in the art would understand that a structure shown in FIG. 21 constitutes no limitation on the computer device 2100, and the computer device may include more or fewer components than those shown in the figure, or some components may be combined, or a different component deployment may be used.

In an example embodiment, a non-temporary computer-readable storage medium including an instruction is further provided. For example, the non-temporary computer-readable storage medium includes at least one instruction, at least one program, a code set, or an instruction set. The at least one instruction, the at least one program, the code set, or the instruction set may be executed by a processor to implement all or some operations of the method shown according to the corresponding embodiment in FIG. 3, FIG. 4, or FIG. 6. For example, the non-temporary computer-readable storage medium may be a ROM, a RAM, a CD-ROM, a magnetic tape, a floppy disk, or an optical data memory device.

At least one of the components, elements, modules or units described herein may be embodied as various numbers of hardware, software and/or firmware structures that execute respective functions described above, according to an example embodiment. For example, at least one of these components, elements or units may use a direct circuit structure, such as a memory, a processor, a logic circuit, a look-up table, etc. that may execute the respective functions through controls of one or more microprocessors or other control apparatuses. Also, at least one of these components, elements or units may be specifically embodied by a module, a program, or a part of code, which contains one or more executable instructions for performing specified logic functions, and executed by one or more microprocessors or other control apparatuses. Also, at least one of these components, elements or units may further include or implemented by a processor such as a central processing unit (CPU) that performs the respective functions, a microprocessor, or the like. Two or more of these components, elements or units may be combined into one single component, element or unit which performs all operations or functions of the combined two or more components, elements of units. Also, at least part of functions of at least one of these components, elements or units may be performed by another of these components, element or units. Further, although a bus is not illustrated in the block diagrams, communication between the components, elements or units may be performed through the bus. Functional aspects of the above example embodiments may be implemented in algorithms that execute on one or more processors. Furthermore, the components, elements or units represented by a block or processing operations may employ any number of related art techniques for electronics configuration, signal processing and/or control, data processing and the like.

After considering the specification and implementing the present disclosure, a person skilled in the art can readily think of other implementations of the disclosure. The disclosure is intended to cover any variations, uses or adaptations of the disclosure following the general principles of the disclosure, and includes the well-known knowledge and conventional technical means in the art and undisclosed in the disclosure. The specification and the embodiments are merely considered as examples, and the actual scope and the spirit of the disclosure are pointed out by the following claims.

It is to be understood that the disclosure is not limited to the accurate structures that are described in the foregoing and that are shown in the accompanying drawings, and modifications and changes may be made without departing from the scope of the disclosure. The scope of the disclosure is subject only to the appended claims.

What is claimed is:

1. A virtual vehicle control method in a virtual scene, performed by a terminal, the method comprising:
   providing a display interface of an application program, the display interface comprising a scene picture of the virtual scene, and the virtual scene comprising a virtual vehicle;
   obtaining a moving speed of the virtual vehicle; and
   adjusting, based on the moving speed of the virtual vehicle being greater than a moving speed threshold, the scene picture to a picture of the virtual vehicle being observed in the virtual scene by using a camera model in a predetermined viewing angle direction, the camera model being located at a position with respect to the virtual vehicle,
   wherein the display interface further comprises at least one primary virtual control that is overlaid on the scene picture, and the method further comprises:
   detecting a touch and slide operation that slides to a target point on the at least one primary virtual control;
   obtaining a virtual throttle opening of the virtual vehicle according to one of a directional angle and a transverse offset distance of the target point relative to a central position of the at least one primary virtual control; and
   controlling the virtual vehicle to move according to the virtual throttle opening of the virtual vehicle.

2. The method according to claim 1, further comprising:
   obtaining a steering angle of the virtual vehicle according to a straight-line distance between the target point and the central position of the at least one primary virtual control; and
   controlling the virtual vehicle to move according to the steering angle of the virtual vehicle.

3. The method according to claim 1, further comprising:
   controlling the virtual vehicle to accelerate within a maximum moving speed according to the virtual throttle opening.

4. The method according to claim 1, wherein the display interface further comprises an auxiliary virtual control that is overlaid on the scene picture, and
   wherein the auxiliary virtual control comprises at least one of a longitudinal attitude control for controlling a longitudinal attitude of the virtual vehicle, a sudden acceleration control for controlling the virtual vehicle to perform sudden acceleration, a brake control for controlling the virtual vehicle to brake, or a reverse control for controlling the virtual vehicle to reverse.

5. The method according to claim 1, wherein the at least one primary virtual control has a circular shape, and based on a straight-line distance between the target point and the central position of the at least one primary virtual control reaching or exceeding a radius of the at least one primary virtual control, a maximum value of the virtual throttle opening is obtained.

6. The method according to claim 1, further comprising:
   based on a position of the target point on the at least one primary virtual control being located in an upper half part of the at least one primary virtual control, controlling the virtual vehicle to move forward, and based on the position of the target point on the at least one primary virtual control being located in a lower half part of the at least one primary virtual control, controlling the virtual vehicle to move backward.

7. The method according to claim 1, further comprising, prior to displaying the at least one primary virtual control on the display interface:
   displaying a control mode selection interface including a double control mode option for controlling a steering angle and the virtual throttle opening through two virtual controls, and a single control mode option for controlling the steering angle and the virtual throttle opening through a single virtual control; and
   displaying the at least one primary virtual control for controlling the steering angle and the virtual throttle opening based on a selection of the single control mode option.

8. A non-transitory computer-readable storage medium, storing program code executable by at least one processor to cause the at least one processor to perform the method according to claim 1.

9. A virtual vehicle control method in a virtual scene, performed by a terminal, the method comprising:
   providing a display interface of an application program, the display interface comprising a scene picture of the virtual scene and at least one primary virtual control, the virtual scene comprising a virtual vehicle and the at least one primary virtual control being overlaid on the scene picture;
   detecting a touch and slide operation that slides to a target point on the at least one primary virtual control;
   obtaining a virtual throttle opening of the virtual vehicle according to one of a directional angle and a transverse offset distance of the target point relative to a central position of the at least one primary virtual control; and
   controlling the virtual vehicle to move according to the virtual throttle opening of the virtual vehicle.

10. The method according to claim 9, further comprising:
obtaining a steering angle of the virtual vehicle according to a straight-line distance between the target point and the central position of the at least one primary virtual control; and
controlling the virtual vehicle to move according to the steering angle of the virtual vehicle.

11. The method according to claim 10, wherein the at least one primary virtual control comprises a first virtual control and a second virtual control, and
wherein the obtaining the steering angle of the virtual vehicle comprises obtaining the steering angle of the virtual vehicle according to a position of a target point, relative to a central position of the first virtual control, of a first slide operation performed in a region around the first virtual control, and obtaining the virtual throttle opening of the virtual vehicle comprises obtaining the virtual throttle opening of the virtual vehicle according to a position of a target point, relative to a central position of the second virtual control, of a second slide operation performed in a region around the second virtual control.

12. The method according to claim 11, wherein the obtaining the steering angle of the virtual vehicle according to the position of the target point of the first slide operation comprises obtaining the steering angle of the virtual vehicle according to a straight-line distance between the target point and the central position of the first virtual control, and
wherein the obtaining the virtual throttle opening of the virtual vehicle according to the position of the target point of the second slide operation comprises obtaining the virtual throttle opening of the virtual vehicle according to the directional angle of the position of the target point of the second slide operation relative to the central position of the second virtual control, or according to a transverse offset distance of the position of the target point of the second slide operation relative to the central position of the second virtual control.

13. The method according to claim 9, wherein the display interface further comprises an auxiliary virtual control, and the auxiliary virtual control comprises at least one of a longitudinal attitude control for controlling a longitudinal attitude of the virtual vehicle, a sudden acceleration control for controlling the virtual vehicle to perform sudden acceleration, a brake control for controlling the virtual vehicle to brake, or a reverse control for controlling the virtual vehicle to reverse.

14. The method according to claim 9, further comprising:
obtaining a moving speed of the virtual vehicle; and
adjusting, based on the moving speed of the virtual vehicle being greater than a moving speed threshold, the scene picture to a picture of the virtual vehicle being observed in the virtual scene by using a camera model in a predetermined viewing angle direction, the camera model being located at a position with respect to the virtual vehicle.

15. A non-transitory computer-readable storage medium, storing program code executable by at least one processor to cause the at least one processor to perform the method according to claim 9.

16. A terminal, comprising:
at least one memory configured to store program code; and
at least one processor configured to read the program code and operate as instructed by the program code, the program code comprising:
interface providing code configured to cause at least one of the at least one processor to provide a display interface of an application program, the display interface comprising a scene picture of a virtual scene and at least one primary virtual control, the virtual scene comprising a virtual vehicle and the at least one primary virtual control being overlaid on the scene picture;
detection code configured to cause at least one of the at least one processor to detect a touch and slide operation that slides to a target point on the at least one primary virtual control;
first obtaining code configured to cause at least one of the at least one processor to obtain a virtual throttle opening of the virtual vehicle according to one of a directional angle and a transverse offset distance of the target point relative to a central position of the at least one primary virtual control; and
control code configured to cause at least one of the at least one processor to control the virtual vehicle to move according to the virtual throttle opening of the virtual vehicle.

17. The terminal according to claim 16, wherein the control code further causes at least one of the at least one processor to control the virtual vehicle to move in a moving direction of the virtual vehicle according to the steering angle of the virtual vehicle or control the virtual vehicle to accelerate within a maximum moving speed of the virtual vehicle according to the virtual throttle opening of the virtual vehicle.

18. The terminal according to claim 16, wherein the at least one primary virtual control comprises a first virtual control and a second virtual control,
wherein the program code further comprises second obtaining code configured to cause at least one of the at least one processor to adjust a steering angle of the virtual vehicle according to a position of a target point, relative to a central position of the first virtual control, of the slide operation performed in a region around the first virtual control, and
wherein the first obtaining code is configured to cause at least one of the at least one processor to obtain the virtual throttle opening of the virtual vehicle according to a position of a target point, relative to a central position of the second virtual control, of the slide operation performed in a region around the second virtual control.

19. The terminal according to claim 16, wherein the at least one primary virtual control has a circular shape, and based on straight-line distance between the target point and the central position of the at least one primary virtual control reaching or exceeding a radius of the at least one primary virtual control, a maximum value of the virtual throttle opening is obtained.

20. The terminal according to claim 16, wherein the program code further comprises:
obtaining code configured to cause at least one of the at least one processor to obtain a moving speed of the virtual vehicle; and
scene adjusting code configured to cause at least one of the at least one processor to adjust, based on the moving speed of the virtual vehicle being greater than a moving speed threshold, the scene picture to a picture of the virtual vehicle being observed in the virtual scene by using a camera model in a predetermined viewing angle direction, the camera model being located at a position with respect to the virtual vehicle.

* * * * *